(12) United States Patent
Gilbreth et al.

(10) Patent No.: US 6,958,550 B2
(45) Date of Patent: Oct. 25, 2005

(54) METHOD AND SYSTEM FOR CONTROL OF TURBOGENERATOR POWER AND TEMPERATURE

(75) Inventors: Mark Gilbreth, Woodland Hills, CA (US); Joel Wacknov, Westlake, CA (US); Simon Wall, Faversham (GB)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 10/887,297

(22) Filed: Jul. 9, 2004

(65) Prior Publication Data

US 2004/0245783 A1 Dec. 9, 2004

Related U.S. Application Data

(63) Continuation of application No. 10/037,916, filed on Jan. 2, 2002, now Pat. No. 6,870,279, which is a continuation-in-part of application No. 09/207,817, filed on Dec. 8, 1998, now Pat. No. 6,487,096.
(60) Provisional application No. 60/080,457, filed on Apr. 2, 1998.

(51) Int. Cl.[7] .................................................. F02C 9/30
(52) U.S. Cl. .................... 290/52; 290/2; 60/772
(58) Field of Search ............................. 290/1 A, 2, 52; 322/10, 14; 60/772, 776

(56) References Cited

U.S. PATENT DOCUMENTS

| | | | | |
|---|---|---|---|---|
| 6,031,294 A | * | 2/2000 | Geis et al. | 290/52 |
| 6,093,975 A | * | 7/2000 | Peticolas | 290/52 |
| 6,169,332 B1 | * | 1/2001 | Taylor et al. | 290/7 |
| 6,410,992 B1 | * | 6/2002 | Wall et al. | 290/52 |
| 6,487,096 B1 | * | 11/2002 | Gilbreth et al. | 363/35 |
| 6,664,654 B2 | * | 12/2003 | Wall et al. | 290/52 |
| 6,683,389 B2 | * | 1/2004 | Geis | 290/40 C |
| 6,739,845 B2 | * | 5/2004 | Woollenweber | 417/407 |
| 6,870,279 B2 | * | 3/2005 | Gilbreth et al. | 290/52 |

* cited by examiner

*Primary Examiner*—Nicholas Ponomarenko
(74) *Attorney, Agent, or Firm*—Waddey & Patterson; Lucian Wayne Beavers

(57) ABSTRACT

A power controller controls the turbine of a turbine powered generating system regardless of the load on the system to maximize the efficiency of the turbine and maintains the turbine at a substantially constant temperature during a system load change by using an energy storage device to provide power to the load while the turbine is changing speed to meet the new load demand.

20 Claims, 19 Drawing Sheets

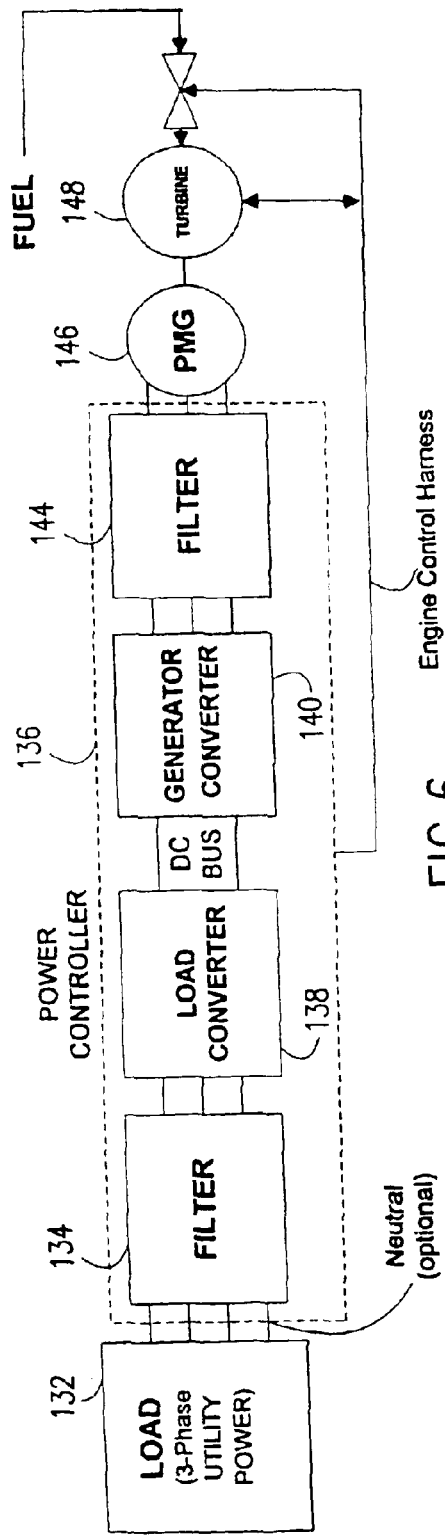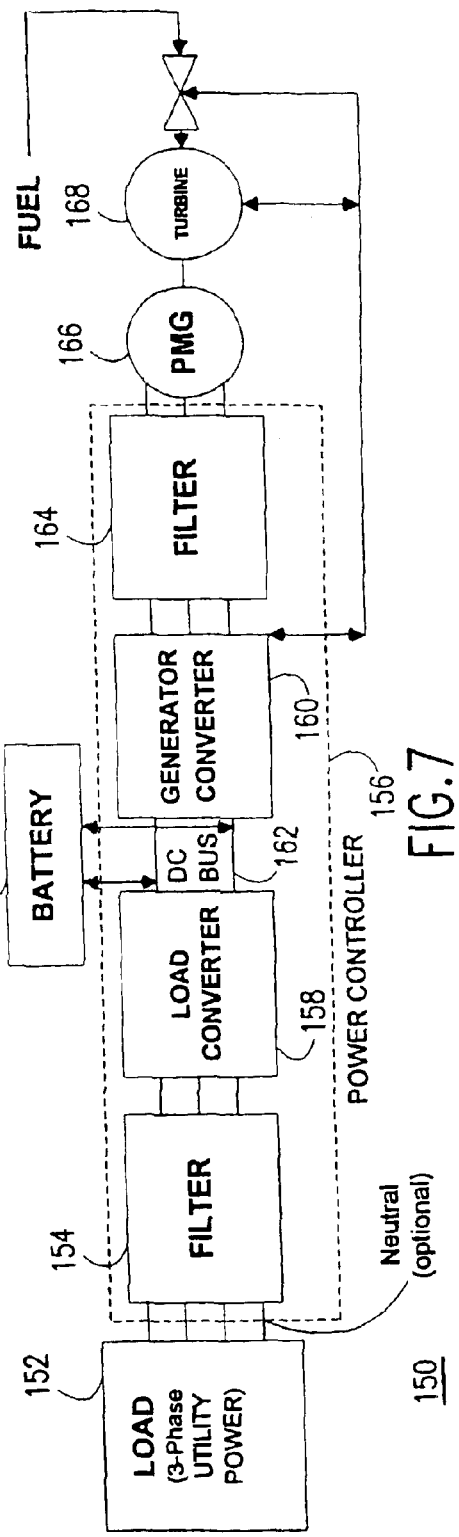

METHOD AND SYSTEM FOR CONTROL OF TURBOGENERATOR POWER AND TEMPERATURE

RELATED APPLICATIONS

This application is a continuation of, and claims the benefit of the filing date of, application Ser. No. 10/037,916, filed on Jan. 2, 2002, now U.S. Pat. No. 6,870,279 which, in turn, is a continuation-in-part, and claims the benefit of the filing date of, application Ser. No. 09/207,817 filed on Dec. 8, 1998, now U.S. Pat. No. 6,487,096 which claims the benefit of U.S. Provisional Application No. 60/080,457, filed on Apr. 2, 1998; and which is a continuation-in-part, and claims the benefit of the filing date of, the reissue application of U.S. Pat. No. 6,031,294 filed on Dec. 31, 2001, Ser. No. 10/039,819.

BACKGROUND OF THE INVENTION

The operating efficiency of a turbine typically increases along with the fuel combustion temperature, which is most often limited by the materials used to construct the combustor components such as the fuel inlet nozzle or nozzles. It is therefore usually desirable to operate a turbine at or near the maximum temperature limit, which usually requires operating at full load. Thus, conventionally, using a turbine to provide a varying load results in reduced fuel efficiency. What is therefore needed is a system and method of operating a turbine to provide a varying amount of power while maintaining a substantially constant and/or maximum combustion temperature.

SUMMARY OF THE INVENTION

In one aspect, the invention provides a method and apparatus for controlling the turbine of a turbine powered generating system regardless of the load on the system to maximize the efficiency of the turbine, where the turbine has a fixed nozzle geometry and the system further includes an electrical generator and a storage device. The method and apparatus comprises maintaining the inlet nozzle at a substantially constant temperature and using the electrical generator to satisfy the first power demand on the system until the system is required to satisfy an additional power demand. When additional power is demanded, the storage device temporarily satisfies the additional power demand and at least a portion of the first power demand. The speed of the turbine is increased from the speed required to satisfy the first power demand to a higher speed required to satisfy the first power demand and the additional power demand. Once the higher speed is achieved, the electrical generator satisfies both the first power demand and the additional power demand.

In a further aspect, the substantially constant temperature is at or near the maximum design temperature of the turbine. Further, the external storage device may be used to temporarily satisfy all of the additional power demand and the power demand.

In another aspect, the invention provides a method and apparatus for controlling the turbine of a turbine powered generating system regardless of the load on the system to maximize the efficiency of the turbine, where the turbine has a fixed nozzle geometry and the system further includes an electrical generator and a storage device. The method and apparatus comprises maintaining the inlet nozzle at a substantially constant temperature and using the electrical generator to satisfy the first power demand on the system until the system is required to satisfy a lower power demand. When the lower power is demanded the power demand on the generator is temporarily increased and the storage device is temporarily used to absorb the additional power demand and at least a portion of the first power demand. The speed of the turbine is temporarily decreased from the speed required to satisfy the first power demand to a lower speed required to satisfy the lower power demand. Once the lower speed is achieved, the electrical generator satisfies the lower power demand. In a further aspect, the constant temperature is at or near the maximum design temperature of the turbine.

Further features and advantages of the present invention may be more readily understood by reference to the following description taken in conjunction with the accompanying drawings. Like numerals or reference designators will be used to refer to like parts or elements throughout.

BRIEF DESCRIPTION OF THE DRAWINGS

FIG. 6 is a functional block diagram of an interface between load/utility grid and turbine generator using the power controller according to the present invention;

FIG. 7 is a functional block diagram of an interface between load/utility grid and turbine generator using the power controller for a stand-alone application according to the present invention;

DETAILED DESCRIPTION OF THE INVENTION

Figure 1:
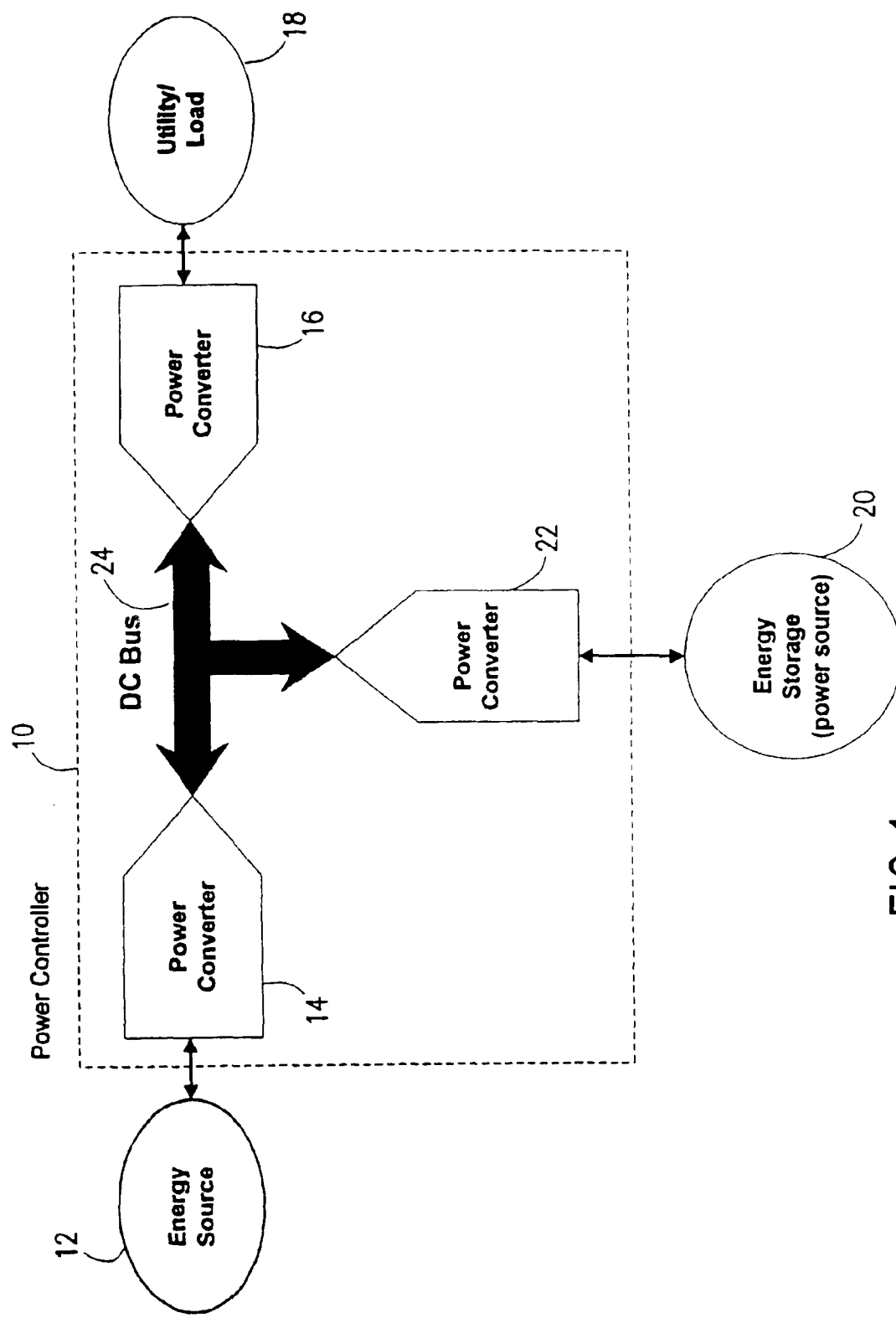
FIG. 1 is a block diagram of a power controller according to the present invention.

Referring to FIG. 1, power controller 10 provides a distributed generation power networking system in which bi-directional (i.e. reconfigurable) power converters are used with a common DC bus for permitting compatibility between one or more energy components. Each power converter operates essentially as a customized bi-directional switching converter configured, under the control of power controller 10, to provide an interface for a specific energy component to DC bus 24. Power controller 10 controls the way in which each energy component, at any moment, will sink or source power, and the manner in which DC bus 24 is regulated. In this way, various energy components can be used to supply, store and/or use power in an efficient manner.

Figure 5:
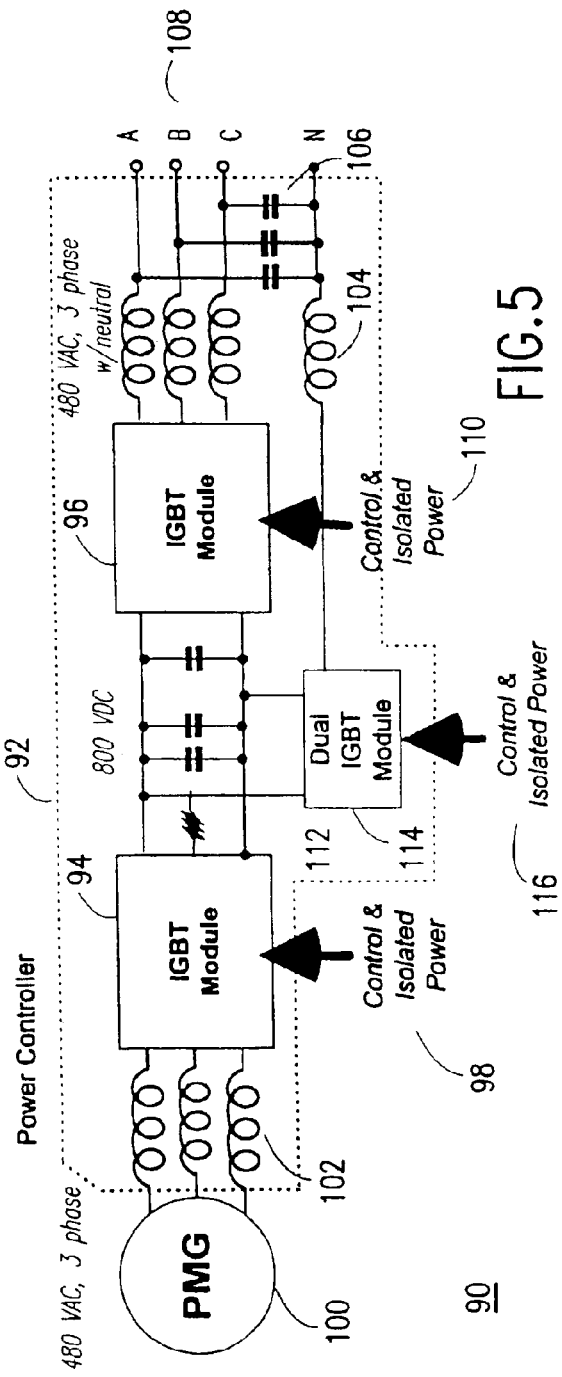
FIG. 5 is a schematic diagram of the internal power architecture of the power controller illustrated in FIG. 1.

One skilled in the art will recognize that the particular configurations shown herein are for illustrative purposes only. In particular, the present invention is not limited to the use of three bi-directional converters as shown in FIG. 1. Rather, the number of power converters is dependent on various factors, including but not limited to, the number of energy components and the particular power distribution configuration desired. For example, as illustrated in FIGS. 5 and 6, power controller 10 can provide a distributed generation power system with as few as two power converters.

The energy components, as shown in FIG. 1, include energy source 12, utility/load 18 and storage device 20. The present invention is not limited to the distribution of power between energy source 12, energy storage device 20 and utility/load 18, but rather may be adapted to provide power distribution in an efficient manner for any combination of energy components.

Energy source 12 may be a gas turbine, photovoltaics, wind turbine or any other conventional or newly developed source. Energy storage device 20 may be a flywheel, battery, ultracap or any other conventional or newly developed energy storage device. Load 18 may be a utility grid, dc load, drive motor or any other conventional or newly developed utility/load.

Figure 2:
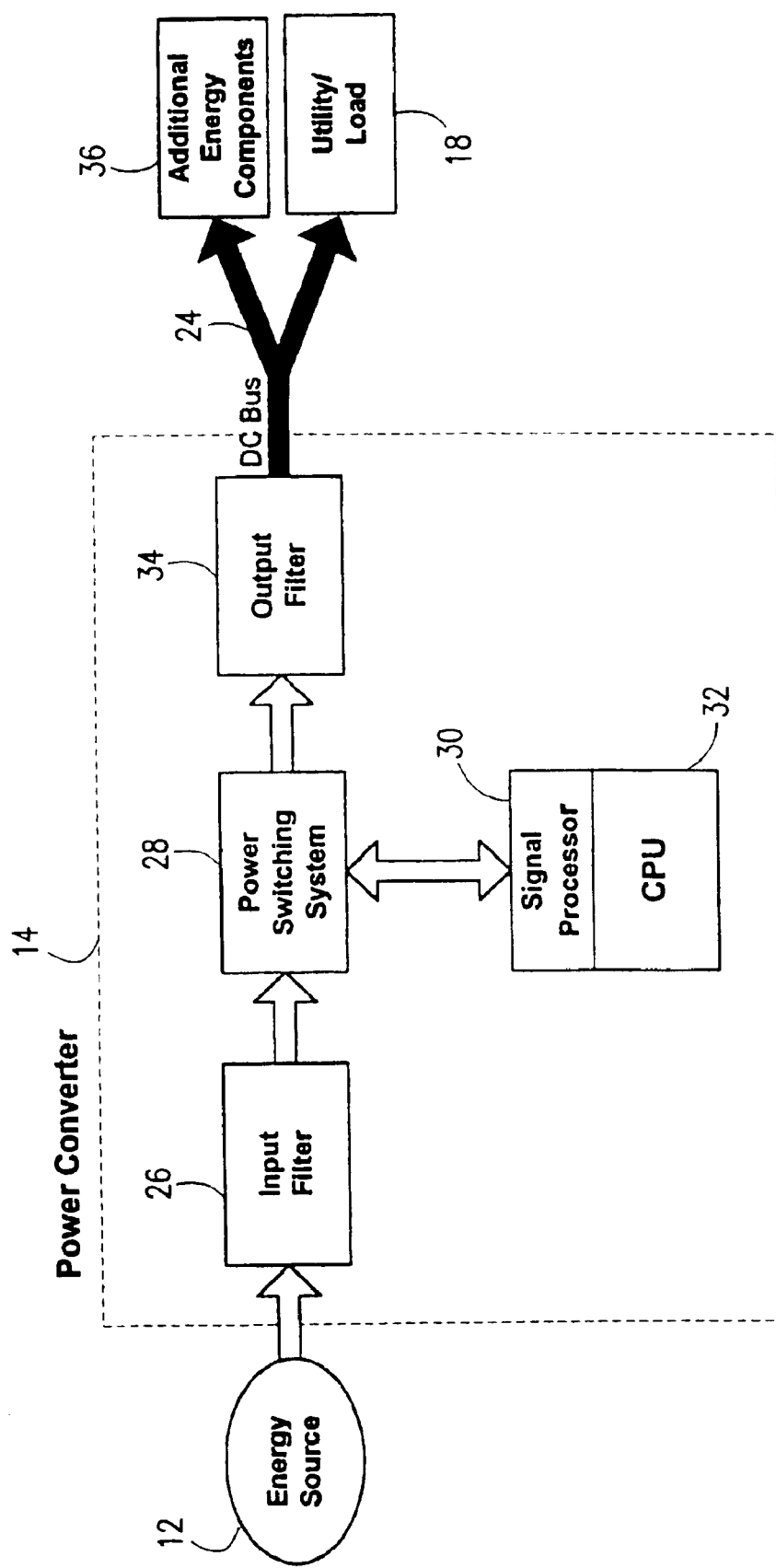
FIG. 2 is a detailed block diagram of a power converter in the power controller illustrated in FIG. 1.

Referring now to FIG. 2, a detailed block diagram of power converter 14 in power controller 10, shown in FIG. 1, is illustrated. Energy source 12 is connected to DC bus 24 via power converter 14. Energy source 12 may be, for example, a gas turbine driving an AC generator to produce AC which is applied to power converter 14. DC bus 24 connects power converter 14 to utility/load 18 and additional energy components 36. Power converter 14 includes input filter 26, power switching system 28, output filter 34, signal processor 30 and main CPU 32. In operation, energy source 12 applies AC to input filter 26 in power converter 14. The filtered AC is then applied to power switching system 28 which may conveniently be a series of insulated gate bipolar transistor (IGBT) switches operating under the control of signal processor (SP) 30 which is controlled by main CPU 32. One skilled in the art will recognize that other conventional or newly developed switches may be utilized as well. The output of the power switching system 28 is applied to output filter 34 which then applies the filtered DC to DC bus 24.

In accordance with the present invention, each power converter 14, 16 and 22 operates essentially as a customized, bi-directional switching converter under the control of main CPU 32, which uses SP 30 to perform its operations. Main CPU 32 provides both local control and sufficient intelligence to form a distributed processing system. Each power converter 14, 16 and 22 is tailored to provide an interface for a specific energy component to DC bus 24. Main CPU 32 controls the way in which each energy component 12, 18 and 20 sinks or sources power, and DC bus 24 is regulated at any time. In particular, main CPU 32 reconfigures the power converters 14, 16 and 22 into different configurations for different modes of operation. In this way, various energy components 12, 18 and 20 can be used to supply, store and/or use power in an efficient manner. In the case of a turbine power generator, for example, a conventional system regulates turbine speed to control the output or bus voltage. In the power controller, the bi-directional controller regulates the bus voltage independently of turbine speed.

Operating Modes

FIG. 1 shows the system topography in which DC bus 24, regulated at 800 v DC for example, is at the center of a star pattern network. In general, energy source 12 provides power to DC bus 24 via power converter 14 during normal power generation mode. Similarly, during the power generation mode, power converter 16 converts the power on DC bus 24 to the form required by utility/load 18, which may be any type of load including a utility web. During other modes of operation, such as utility start up, power converters 14 and 16 are controlled by the main processor to operate in different manners.

For example, energy is needed to start the turbine. This energy may come from load/utility grid 18 (utility start) or from energy storage 20 (battery start), such as a battery, flywheel or ultra-cap. During a utility start up, power converter 16 is required to apply power from load 18 to DC bus 24 for conversion by power converter 14 into the power required by energy source 12 to startup. During utility start, energy source or turbine 12 is controlled in a local feedback loop to maintain the turbine revolutions per minute (RPM). Energy storage or battery 20 is disconnected from DC bus 24 while load/utility grid 10 regulates VDC on DC bus 24.

Similarly, in the battery start mode, the power applied to DC bus 24 from which energy source 12 is started may be provided by energy storage 20 which may be a flywheel, battery or similar device. Energy storage 20 has its own power conversion circuit in power converter 22, which limits the surge current into DC bus 24 capacitors, and allows enough power to flow to DC Bus 24 to start energy source 12. In particular, power converter 16 isolates DC bus 24 so that power converter 14 can provide the required starting power from DC bus 24 to energy source 12.

Electronics Architecture

Figure 3:
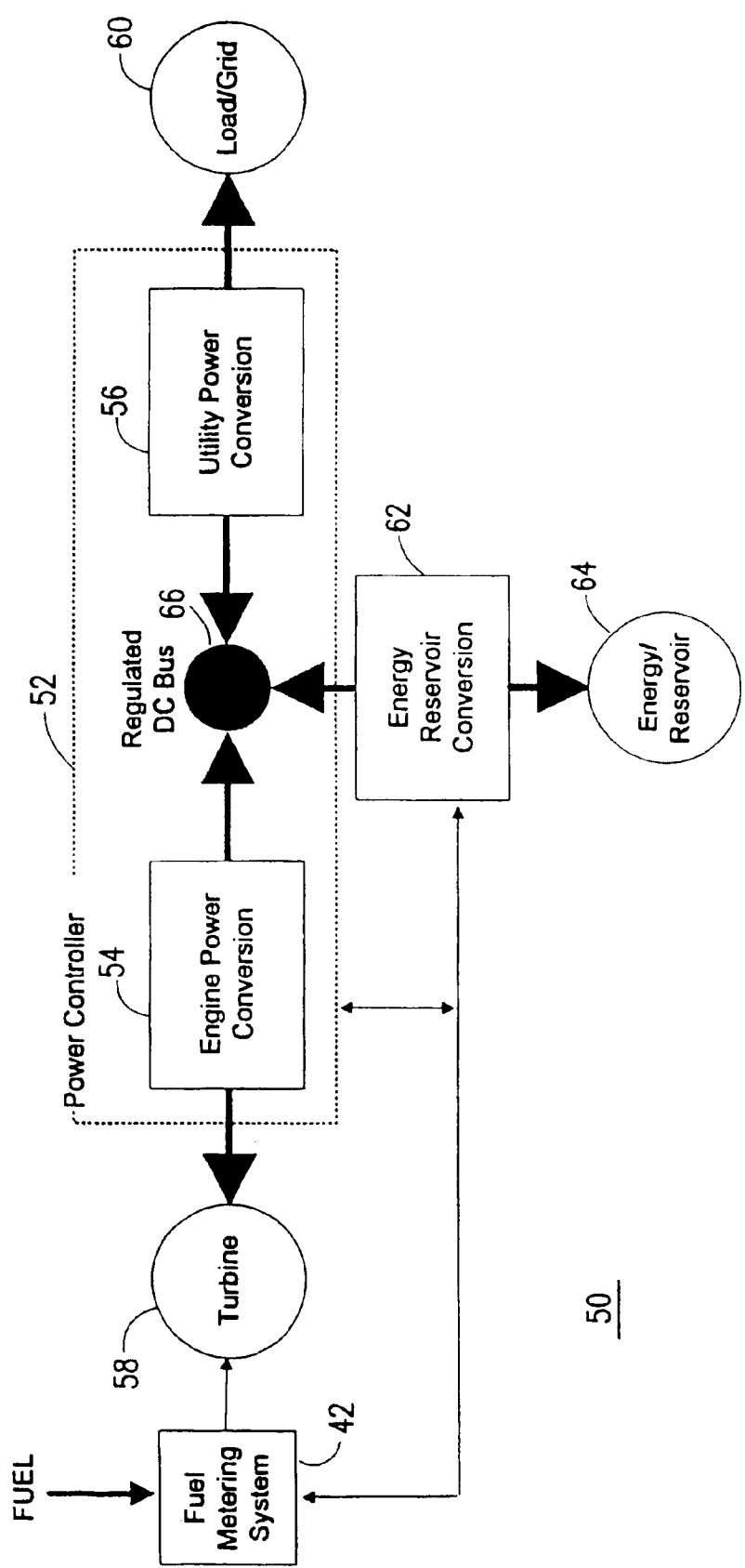
FIG. 3 is a simplified block diagram of a turbine system including the power architecture of the power controller illustrated in FIG. 1.

Referring to FIG. 3, a simplified block diagram of a turbine system 50 using the power controller electronics architecture of the present invention is illustrated. The turbine system 50 includes a fuel metering system 42, turbine engine 58, power controller 52, energy reservoir conversion 62, energy/reservoir 64 and load/utility grid 60. The fuel metering system 42 is matched to the available fuel and pressure. The power controller 52 converts the electricity from turbine engine 58 into regulated DC and then into utility grade AC electricity. By separating the engine control from the converter that creates the utility grade power, greater control of both processes is realized. All of the interconnections are comprised of a communications bus and a power connection.

The power controller 52 includes an engine power conversion 54 and utility power conversion 56 which provides for the two power conversions that take place between the turbine 58 and the load/utility grid 60. One skilled in the art will recognize that the power controller 52 can provide a distributed generation power system with as few as two power converters 54 and 56. The bi-directional (i.e. reconfigurable) power converters 54 and 56 are used with a common regulated DC bus 66 for permitting compatibility between the turbine 58 and load/utility grid 60. Each power converter 54 and 56 operates essentially as a customized bi-directional switching converter configured, under the control of the power controller 10, to provide an interface for a specific energy component 58 or 60 to the DC bus 66. The power controller 10 controls the way in which each energy component, at any moment, will sink or source power, and the manner in which the DC bus 66 is regulated. Both of these power conversions 54 and 56 are capable of operating in a forward or reverse direction. This allows starting the turbine 58 from either the energy reservoir 64 or the load/utility grid 60. The regulated DC bus 66 allows a standardized interface to energy reservoirs such as batteries, flywheels, and ultra-caps. The architecture of the present invention permits the use of virtually any technology that can convert its energy to/from electricity. Since the energy may flow in either direction to or from the energy reservoir 64, transients may be handled by supplying energy or absorbing energy. Not all systems will need the energy reservoir 64. The energy reservoir 64 and its energy reservoir conversion 62 are not contained inside the power controller 52.

Figure 4:
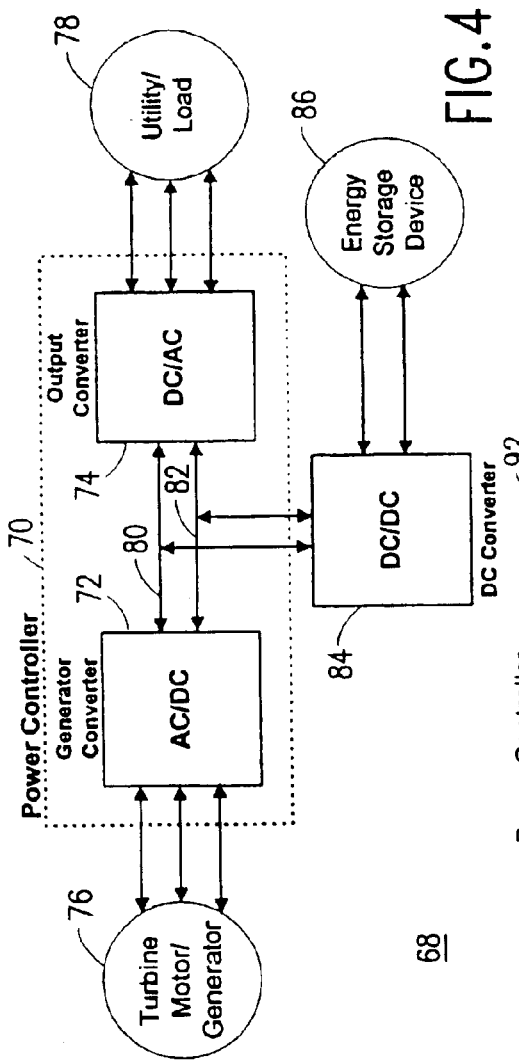
FIG. 4 is a block diagram of the power architecture of a typical implementation of the power controller illustrated in FIG. 1.

Referring to FIG. 4, the power architecture 68 of a typical implementation of the power controller 70 is shown. The power controller 70 includes a generator converter 72 and output converter 74 which provides for the two power conversions that take place between the turbine 76 and the load/utility grid 78. In particular, the generator converter 72 provides for AC to DC power conversion and the output converter 74 provides for DC to AC power conversion. Both of these power converters 72 and 74 are capable of operating in a forward or reverse direction. This allows starting the turbine 76 from either the energy storage device 86 or the load/utility grid 78. Since the energy may flow in either direction to or from the energy storage device 86, transients may be handled by supplying energy or absorbing energy. The energy storage device 86 and its DC converter 84 are not contained inside the power controller 70. The DC converter 84 provides for DC to DC power conversion.

Referring to FIG. 5, a schematic 90 of a typical internal power architecture, such as that shown in FIG. 4, is shown. The turbine has an integral Permanent Magnet Generator (PMG) that can be used as either a motor (for starting) or a generator (normal mode of operation). Because all of the controls can be performed in the digital domain and all switching (except for one output contactor) is done with solid state switches, it is easy to shift the direction of the power flow as needed. This permits very tight control of the turbine during starting and stopping. In a typical configuration, the power output is a 480 VAC, 3-phase output. One skilled in the art will recognize that the present invention may be adapted to provide for other power output requirements such as a 3-phase, 400 VAC, and single-phase, 480 VAC.

Power controller 92 includes generator converter 94 and output converter 96. Generator converter 94 includes IGBT switches 94, such as a seven-pack IGBT module 94, driven by control logic 98, providing a variable voltage, variable frequency 3-phase drive to the PMG 100. Inductors 102 are utilized to minimize any current surges associated with the high frequency switching components which may affect the PMG 100 to increase operating efficiency.

IGBT module 94 is part of the electronics that controls the engine of the turbine. IGBT module 94 incorporates gate driver and fault sensing circuitry as well as a seventh IGBT used to dump power into a resistor. The gate drive inputs and fault outputs require external isolation. Four external, isolated power supplies are required to power the internal gate drivers. IGBT module 94 is typically used in a turbine system that generates 480 VAC at its output terminals delivering up to 30 kWatts to a freestanding or utility-connected load. During startup and cool down (and occasionally during normal operation), the direction of power flow through the seven-pack reverses. When the turbine is being started, power is supplied to the DC bus 112 from either a battery (not shown) or from the utility grid 108. The DC is converted to a variable frequency AC voltage to motor the turbine.

For utility grid connect operation, control logic 110 sequentially drives the solid state IGBT switches, typically configured in a six-pack IGBT module 96, associated with load converter 96 to boost the utility voltage to provide start power to the generator converter 94. The IGBT switches in load converter 96 are preferably operated at a high (15 kHz) frequency, and modulated in a pulse width modulation manner to provide four quadrant converter operation. Inductors 104 and AC filter capacitors 106 are utilized to minimize any current surges associated with the high frequency switching components which may affect load 108.

Six-pack IGBT module 96 is part of the electronics that controls the converter of the turbine. IGBT module 96 incorporates gate driver and fault sensing circuitry. The gate drive inputs and fault outputs require external isolation. Four external, isolated power supplies are required to power the internal gate drivers. IGBT module 96 is typically used in a turbine system that generates 480 VAC at its output terminals delivering up to approximately 30 kWatts to a freestanding or utility-connected load. After the turbine is running, six-pack IGBT module 96 is used to convert the regulated DC bus voltage to the approximately 50 or 60 hertz utility grade power. When there is no battery (or other energy reservoir), the energy to run the engine during startup and cool down must come from utility grid 108. Under this condition, the direction of power flow through the six-pack IGBT module 96 reverses. DC bus 112 receives its energy from utility grid 108, using six-pack IGBT module 96 as a boost converter (the power diodes act as a rectifier). The DC is converted to a variable frequency AC voltage to motor the turbine. To accelerate the engine as rapidly as possible at first, current flows at the maximum rate through seven-pack IGBT module 94 and also six-pack IGBT module 96.

Dual IGBT module 114, driven by control logic 116, is used to provide an optional neutral to supply 3 phase, 4 wire loads.

Startup

Energy is needed to start the turbine. Referring to FIGS. 3 and 4, this energy may come from utility grid 60 or from energy reservoir 64, such as a battery, flywheel or ultra-cap. When utility grid 60 supplies the energy, utility grid 60 is connected to power controller 52 through two circuits. First is an output contactor that handles the full power (30 kWatts). Second is a "soft-start" or "pre-charge" circuit that supplies limited power (it is current limited to prevent very large surge currents) from utility grid 60 to DC bus 66 through a simple rectifier. The amount of power supplied through the soft-start circuit is enough to start the housekeeping power supply, power the control board, and run the power supplies for the IGBTs, and close the output contactor. When the contactor closes, the IGBTs are configured to create DC from the AC waveform. Enough power is created to run the fuel metering circuit 42, start the engine, and close the various solenoids (including the dump valve on the engine).

When energy reservoir 64 supplies the energy, energy reservoir 64 has its own power conversion circuit 62 that limits the surge current into DC bus capacitors. Energy reservoir 64 allows enough power to flow to DC bus 66 to run fuel-metering circuit 42, start the engine, and close the various solenoids (including the dump valve on the engine). After the engine becomes self-sustaining, the energy reservoir starts to replace the energy used to start the engine, by drawing power from DC bus 66. In addition to the sequences described above, power controller senses the presence of other controllers during the initial power up phase. If another controller is detected, the controller must be part of a multi-pack, and proceeds to automatically configure itself for operation as part of a multi-pack.

System Level Operation

Referring to FIG. 6, a functional block diagram 130 of an interface between utility grid 132 and turbine generator 148 using power controller 136 of the present invention is shown. In this example, power controller 136 includes two bi-directional converters 138 and 140. Permanent magnet generator converter 140 starts turbine 148 (using the generator as a motor) from utility or battery power. Load converter 138 then produces AC power using an output from generator converter 140 to draw power from high-speed turbine generator 148. Power controller 136 also regulates fuel to turbine 148 and provides communications between units (in paralleled systems) and to external entities.

During a utility startup sequence, utility 132 supplies starting power to turbine 148 by "actively" rectifying the line via load converter 138, and then converting the DC to variable voltage, variable frequency 3-phase power in generator converter 140. As is illustrated in FIG. 7, for stand-alone applications 150, the start sequence is the same as the utility start sequence shown in FIG. 6 with the exception that the start power comes from battery 170 under the control of an external battery controller. Load 152 is then fed from the output terminals of load converter 158.

Figure 8:
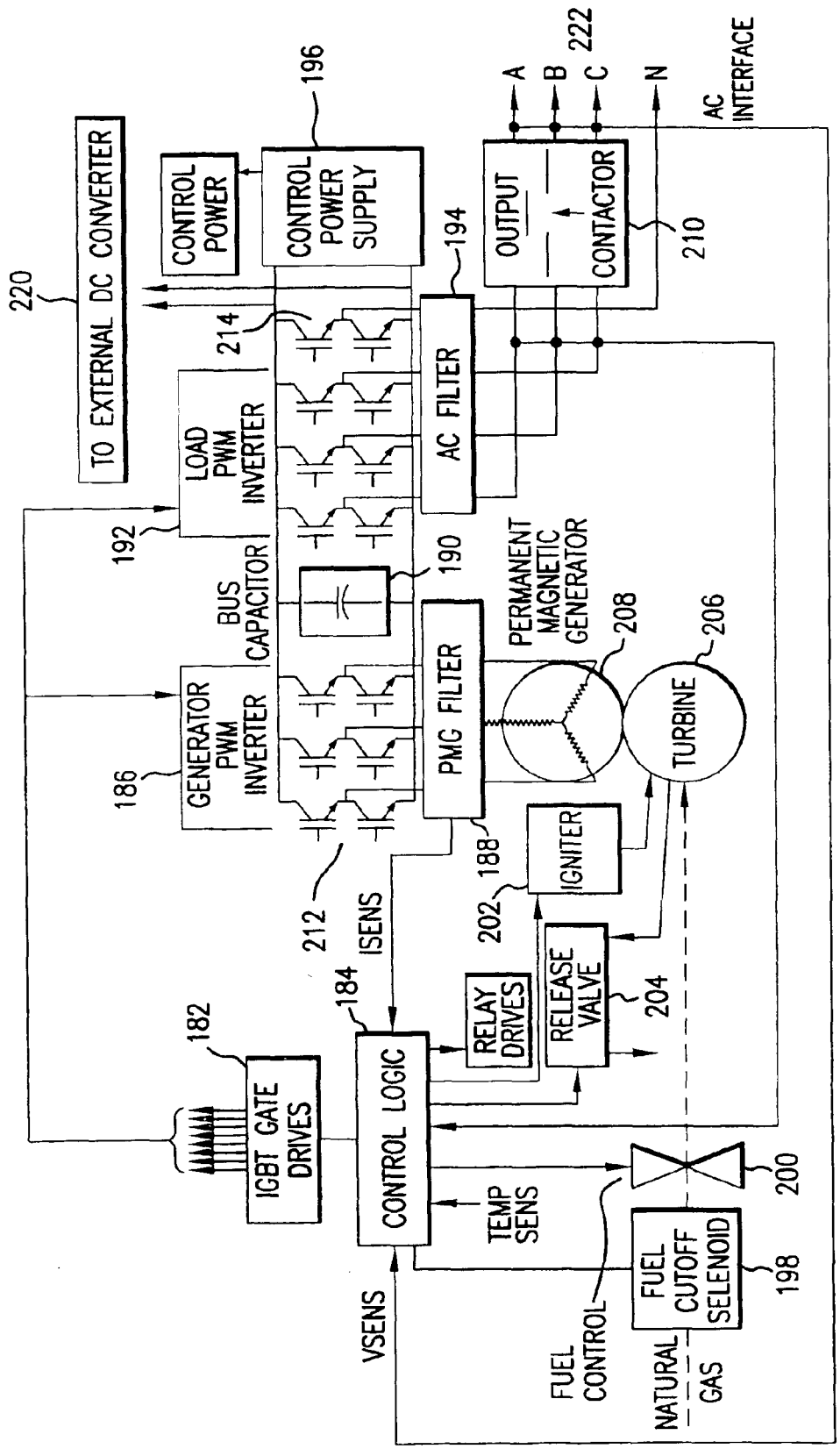
FIG. 8 is a schematic diagram of an interface between a load/utility grid and turbine generator using the power controller according to the present invention.

Referring to FIG. 8, a schematic illustration 180 of an interface between utility grid 132 and turbine generator 148 using the power controller is illustrated. Control logic 184 also provides power to fuel cutoff solenoids 198, fuel control valve 200 and igniter 202. An external battery controller (not shown), if used, connects directly to DC bus 190. In accordance with an alternative embodiment of the invention, a fuel system (not shown) involving a compressor (not shown) operated from a separate variable speed drive can also derive its power directly from DC bus 190.

In operation, control and start power comes from either the external battery controller (for battery start applications) or from the utility, which is connected to a rectifier using inrush limiting techniques to slowly charge internal bus capacitor 190. For utility grid connect operation, control logic 184 sequentially drives solid state IGBT switches 214 associated with load converter 192 to boost the utility voltage to provide start power to generator converter 186. Switches 214 are preferably operated at a high (15 kHz) frequency, and modulated in a pulse width modulation manner to provide four quadrant converter operation. In accordance with the present invention, load converter 192 either sources power from DC bus 190 to utility grid 222 or from utility grid 222 to DC bus 190. A current regulator (not shown) may achieve this control. Optionally, two of the switches 214 serve to create an artificial neutral for stand-alone applications (for stand-alone applications, start power from an external DC supply (not shown) associated with external DC converter 220 is applied directly to DC bus 190).

Solid state (IGBT) switches 212 associated with generator converter 186 are also driven from control logic 184, providing a variable voltage, variable frequency 3-phase drive to generator 208 to start turbine 206. Control logic 184 receives feedback via current sensors Isens as turbine 206 is ramped up in speed to complete the start sequence. When turbine 206 achieves a self sustaining speed of, for example, approx. 40,000 RPM, generator converter 186 changes its mode of operation to boost the generator output voltage and provide a regulated DC bus voltage.

PMG filter 188 associated with generator converter 186 includes three inductors to remove the high frequency switching component from permanent magnet generator 208 to increase operating efficiency. Output AC filter 194 associated with load converter 192 includes three or optionally four inductors (not shown) and AC filter capacitors (not shown) to remove the high frequency switching component. Output contactor 210 disengages load converter 192 in the event of a unit fault.

During a start sequence, control logic 184 opens fuel cutoff solenoid 198 and maintains it open until the system is commanded off. Fuel control 200 may be a variable flow valve providing a dynamic regulating range, allowing minimum fuel during start and maximum fuel at full load. A variety of fuel controllers, including but not limited to, liquid and gas fuel controllers, may be utilized. One skilled in the art will recognize that the fuel control can be by various configurations, including but not limited to a single or dual stage gas compressor accepting fuel pressures as low as approximately ¼ psig. Igniter 202, a spark type device similar to a spark plug for an internal combustion engine, is operated only during the start sequence.

For stand-alone operation, turbine 206 is started using external DC converter 220 which boosts voltage from a battery (not shown), and connects directly to the DC bus 190. Load converter 192 is then configured as a constant voltage, constant frequency (for example, approximately 50 or 60 Hz) source. One skilled in the art will recognize that the output is not limited to a constant voltage, constant frequency source, but rather may be a variable voltage, variable frequency source. For rapid increases in output demand, external DC converter 220 supplies energy temporarily to DC bus 190 and to the output. The energy is restored after a new operating point is achieved.

For utility grid connect operation, the utility grid power is used for starting as described above. When turbine 206 has reached a desired operating speed, converter 192 is operated at utility grid frequency, synchronized with utility grid 222, and essentially operates as a current source converter, requiring utility grid voltage for excitation. If utility grid 222 collapses, the loss of utility grid 222 is sensed, the unit output goes to zero (0) and disconnects. The unit can receive external control signals to control the desired output power, such as to offset the power drawn by a facility, but ensure that the load is not backfed from the system.

Power Controller Software

Figure 9:
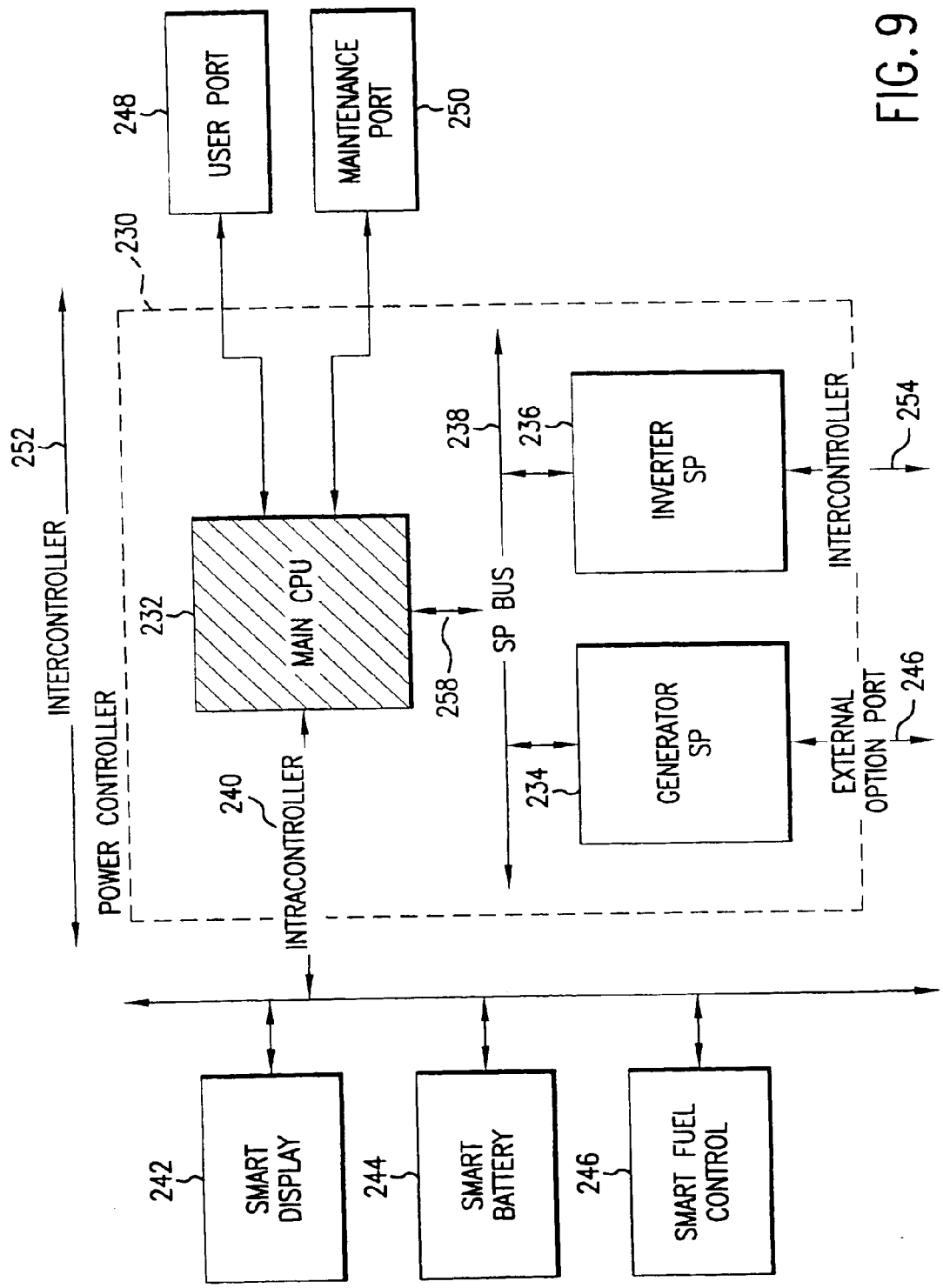
FIG. 9 is a block diagram of the software architecture for the power controller including external interfaces.

Referring to FIG. 9, power controller 230 includes main CPU 232, generator SP 234 and converter SP 236. Main CPU software program sequences events which occur inside power controller 230 and arbitrates communications to externally connected devices. Main CPU 232 is preferably a MC68332 microprocessor, available from Motorola Semiconductor, Inc. of Phoenix, Ariz. Other suitable commercially available microprocessors may be used as well. The software performs the algorithms that control engine operation, determine power output and detect system faults.

Commanded operating modes are used to determine how power is switched through the major converts in the controller. The software is responsible for turbine engine control and issuing commands to other SP processors enabling them to perform the generator converter and output converter power switching. The controls also interface with externally connected energy storage devices (not shown) that provide black start and transient capabilities.

Generator SP 234 and converter SP 236 are connected to power controller 230 via serial peripheral interface (SPI) bus 238 to perform generator and converter control functions. Generator SP 234 is responsible for any switching which occurs between DC bus 258 and the output to generator 76. Converter SP 236 is responsible for any switching which occurs between DC bus 258 and output to load 78. As illustrated in FIG. 5, generator SP 234 and converter SP 236 operate IGBT modules.

Local devices, such as a smart display 242, smart battery 244 and smart fuel control 246, are connected to main CPU 232 in power controller 230 via intracontroller bus 240, which may be a RS485 communications link. Smart display 242, smart battery 244 and smart fuel control 246 perform dedicated controller functions, including but not limited to display, energy storage management, and fuel control functions.

Main CPU 232 in power controller 230 is coupled to user port 248 for connection to a computer, workstation, modem or other data terminal equipment which allows for data acquisition and/or remote control. User port 248 may be implemented using a RS232 interface or other compatible interface.

Main CPU 232 in power controller 230 is also coupled to maintenance port 250 for connection to a computer, workstation, modem or other data terminal equipment which allows for remote development, troubleshooting and field upgrades. Maintenance port 250 may be implemented using a RS232 interface or other compatible interface.

Figure 15:
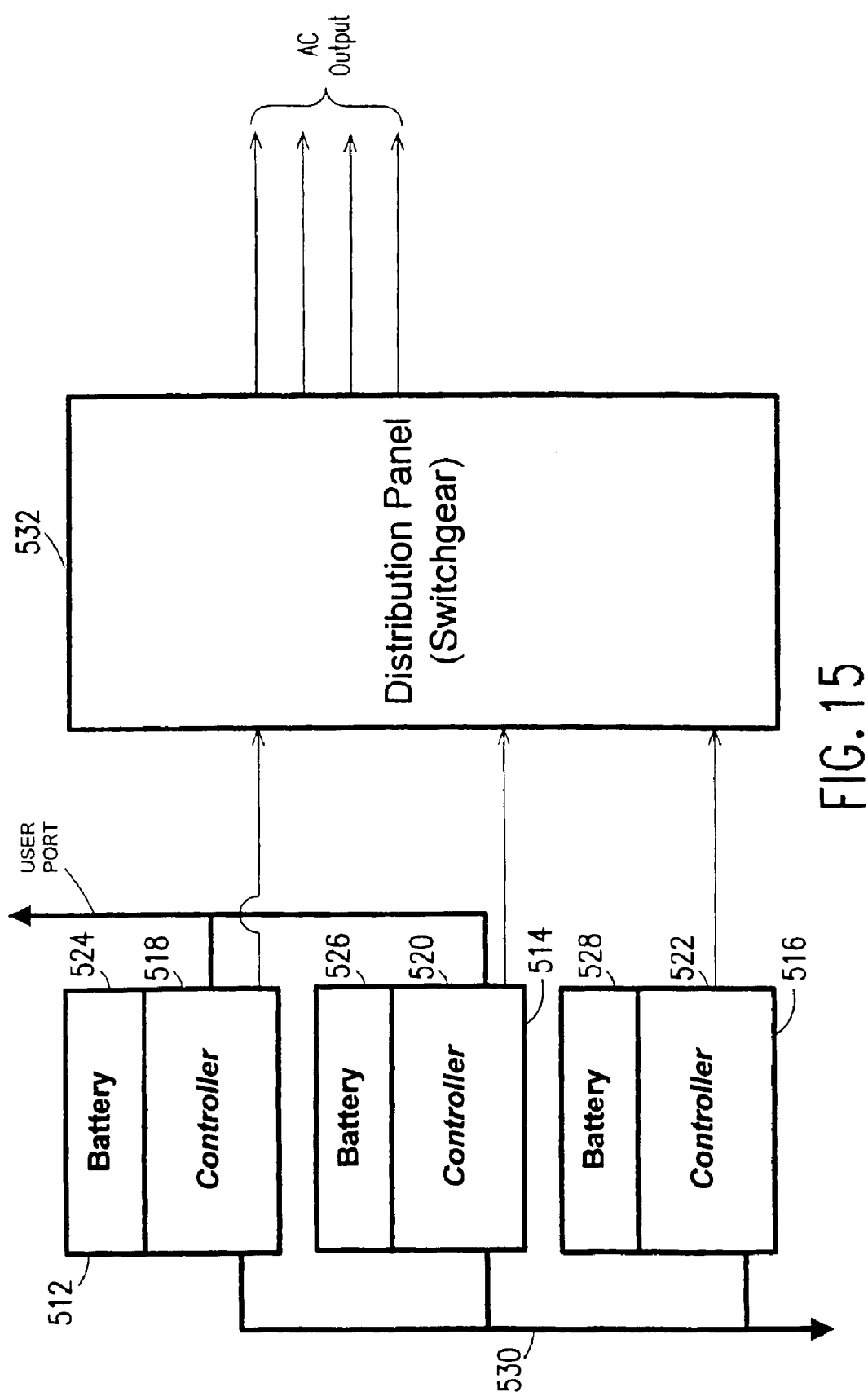
FIG. 15 is a block diagram of the power controller in multi-pack configuration.

The main CPU processor software communicates data through a TCP/IP stack over intercontroller bus 252, typically an Ethernet 10 Base 2 interface, to gather data and send commands between power controllers (as shown and discussed in detail with respect to FIG. 15). In accordance with the present invention, the main CPU processor software provides seamless operation of multiple paralleled units as a single larger generator system. One unit, the master, arbitrates the bus and sends commands to all units.

Intercontroller bus 254, which may be a RS485 communications link, provides high-speed synchronization of power output signals directly between converter SPs, such as converter SP 236. Although the main CPU software is not responsible for communicating on the intercontroller bus 254, it informs converter SPs, including converter SP 236, when main CPU 232 is selected as the master.

External option port bus 256, which may be a RS485 communications link, allows external devices, including but not limited to power meter equipment and auto disconnect switches, to be connected to generator SP 234.

In operation, main CPU 232 begins execution with a power-on self-test when power is applied to the control board. External devices are detected providing information to determine operating modes the system is configured to handle. Power controller 230 waits for a start command by making queries to external devices. Once received, power controller 230 sequences up to begin producing power. As a minimum, main CPU 232 sends commands to external smart devices 242, 244 and 246 to assist with bringing power controller 230 online. If selected as the master, the software may also send commands to initiate the sequencing of other power controllers (FIG. 15) connected in parallel. A stop command will shut down the system bringing it offline.

System I/O

The main CPU 232 software interfaces with several electronic circuits (not shown) on the control board to operate devices that are universal to all power controllers 230. Interface to system I/O begins with initialization of registers within power controller 230 to configure internal modes and select external pin control. Once initialized, the software has access to various circuits including discrete inputs/outputs, analog inputs/outputs, and communication ports. These external devices may also have registers within them that require initialization before the device is operational.

Each of the following sub-sections provides a brief overview that defines the peripheral device the software must interface with. The contents of these sub-sections do not define the precise hardware register initialization required.

Communications

Referring to FIG. 9, main CPU 232 is responsible for all communication systems in power controller 230. Data transmission between a plurality of power controllers 230 is accomplished through intercontroller bus 252. Main CPU 232 initializes the communications hardware attached to power controller 230 for intercontroller bus 252.

Main CPU 232 provides control for external devices, including smart devices 242, 244 and 246, which share information to operate. Data transmission to external devices, including smart display 242, smart battery 244 and smart fuel control 246 devices, is accomplished through intracontroller communications bus 240. Main CPU 232 initializes any communications hardware attached to power controller 230 for intracontroller communications bus 240 and implements features defined for the bus master on intracontroller communications bus 240.

Communications between devices such as switch gear and power meters used for master control functions exchange data across external equipment bus 246. Main CPU 232 initializes any communications hardware attached to power controller 230 for external equipment port 246 and implements features defined for the bus master on external equipment bus 246.

Communications with a user computer is accomplished through user interface port 248. Correspondingly, communications with service engineers, maintenance centers, and so forth are accomplished through maintenance interface port 250. Main CPU 232 initializes any communications hardware attached to power controller 230 for user interface port 248 or maintenance interface port 250. In a typical configuration, at power up, the initial baud rate will be selected to 19200 baud, 8 data bits, 1 stop, and no parity. The user has the ability to adjust and save the communications rate setting via user interface port 248 or optional smart external display 242. The saved communications rate is used the next time power controller 230 is powered on. Main CPU 232 communicates with a modem (not shown), such as a Hayes compatible modem, through user interface port 248 or maintenance interface port 250. Once communications are established, main CPU 232 operates as if were connected to a local computer and operates as a slave on user interface port 248 (it only responds to commands issued).

Communications to service engineers, maintenance centers, and so forth are accomplished through maintenance interface port 250. Main CPU 232 initializes the communications to any hardware attached to power controller 230 for maintenance interface port 250. In a typical implementation, at power up, the initial baud rate will be selected to 19200 baud, 8 data bits, 1 stop, and no parity. The user has the ability to adjust and save the communications rate setting via user port 248 or optional smart external display 242. The saved communications rate is used the next time power controller 230 is powered on. Main CPU 232 communicates with a modem, such as a Hayes compatible modem, through maintenance interface port 250. Once communications are established, main CPU 232 operates as if it were connected to a local computer and operates as a slave on maintenance interface port 250 (it only responds to commands issued).

Controls

Referring to FIG. 9, main CPU 232 orchestrates operation for motor, converter, and engine controls for power controller 230. The main CPU 232 does not directly perform motor and converter controls. Rather, generator and converter SP processors 234 and 236 perform the specific control algorithms based on data communicated from main CPU 232. Engine controls are performed directly by main CPU 232 (see FIG. 14).

Main CPU 232 issues commands via SPI communications bus 238 to generator SP 234 to execute the required motor control functions. Generator SP 234 will operate the motor (not shown) in either a DC bus mode or an RPM mode as selected by main CPU 232. In the DC bus voltage mode, generator SP 234 uses power from the motor to maintain the DC bus at the setpoint. In the RPM mode, generator SP 234 uses power from the motor to maintain the engine speed at the setpoint. Main CPU 232 provides setpoint values.

Main CPU 232 issues commands via SPI communications bus 238 to converter SP 236 to execute required converter control functions. Converter SP 236 will operate the converter (not shown) in a DC bus mode, output current mode, or output voltage mode as selected by main CPU 232. In the DC bus voltage mode, converter SP 236 regulates the utility power provided by power controller 230 to maintain the internal bus voltage at the setpoint. In the output current mode, converter SP 236 uses power from the DC bus to provide commanded current out of the converter. In the output voltage mode, converter SP 236 uses power from the DC bus to provide commanded voltage out of the converter. Main CPU 232 provides Setpoint values.

Figure 10:
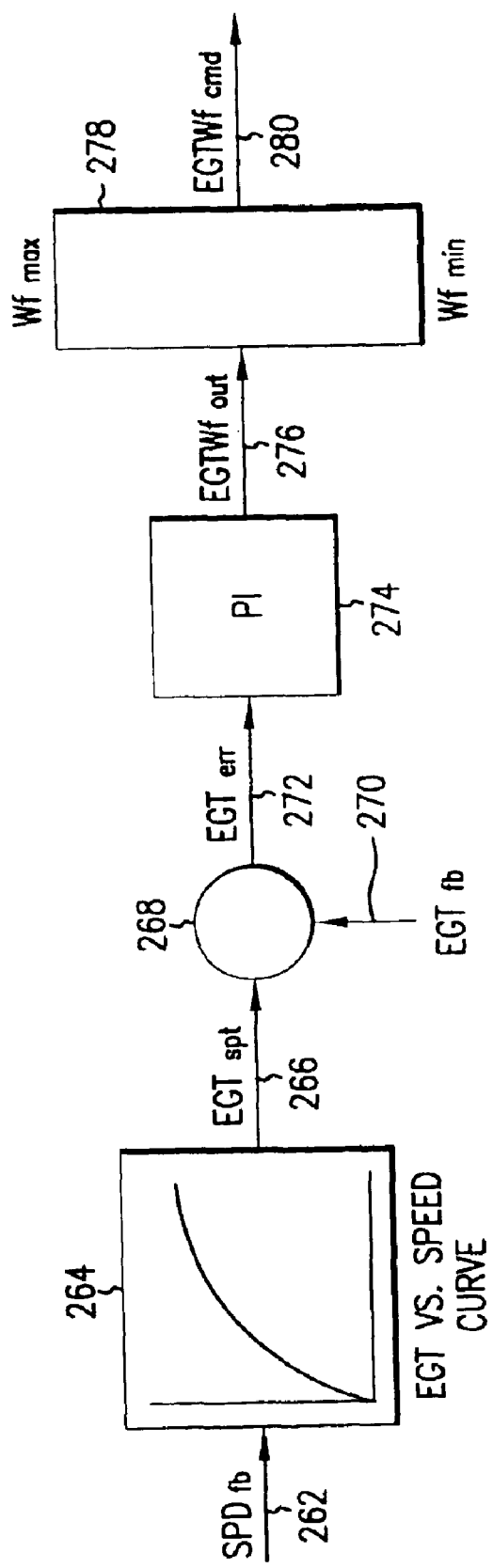
FIG. 10 is a block diagram of an EGT control mode loop for regulating the temperature of the turbine.
Figure 11:
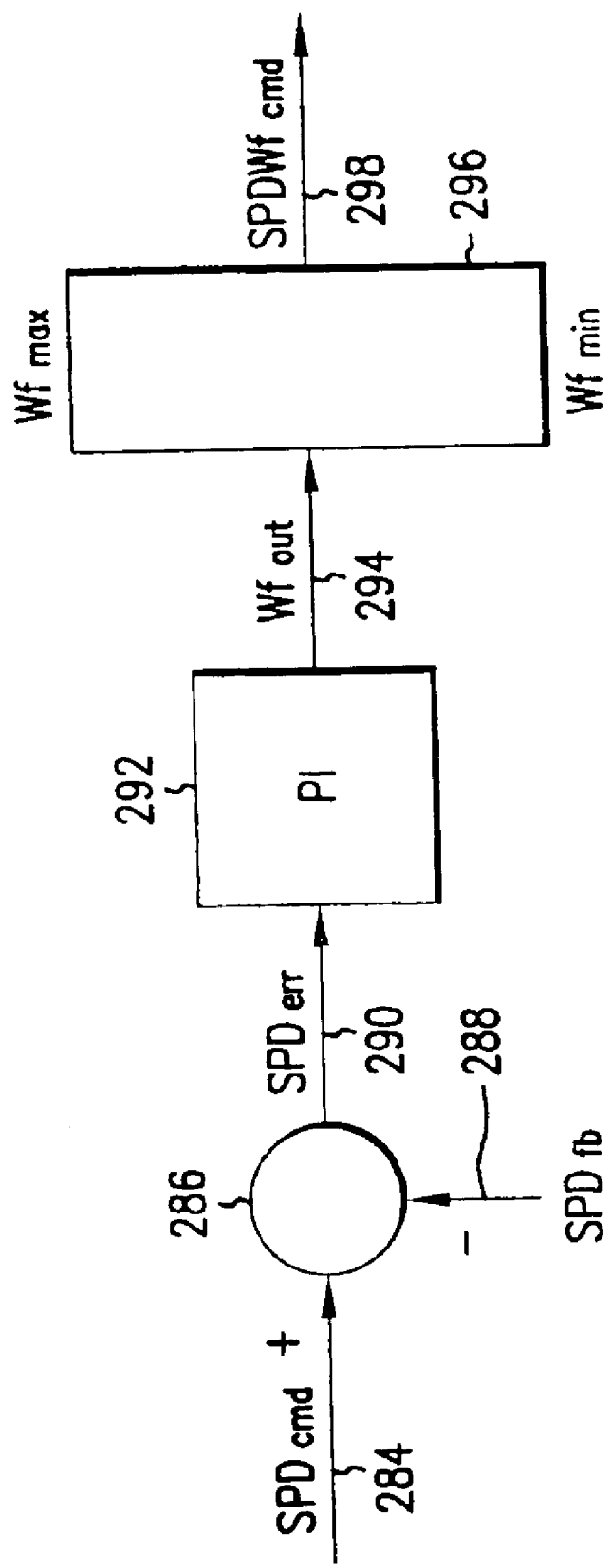
FIG. 11 is a block diagram of a speed control mode loop for regulating the rotating speed of the turbine.
Figure 12:
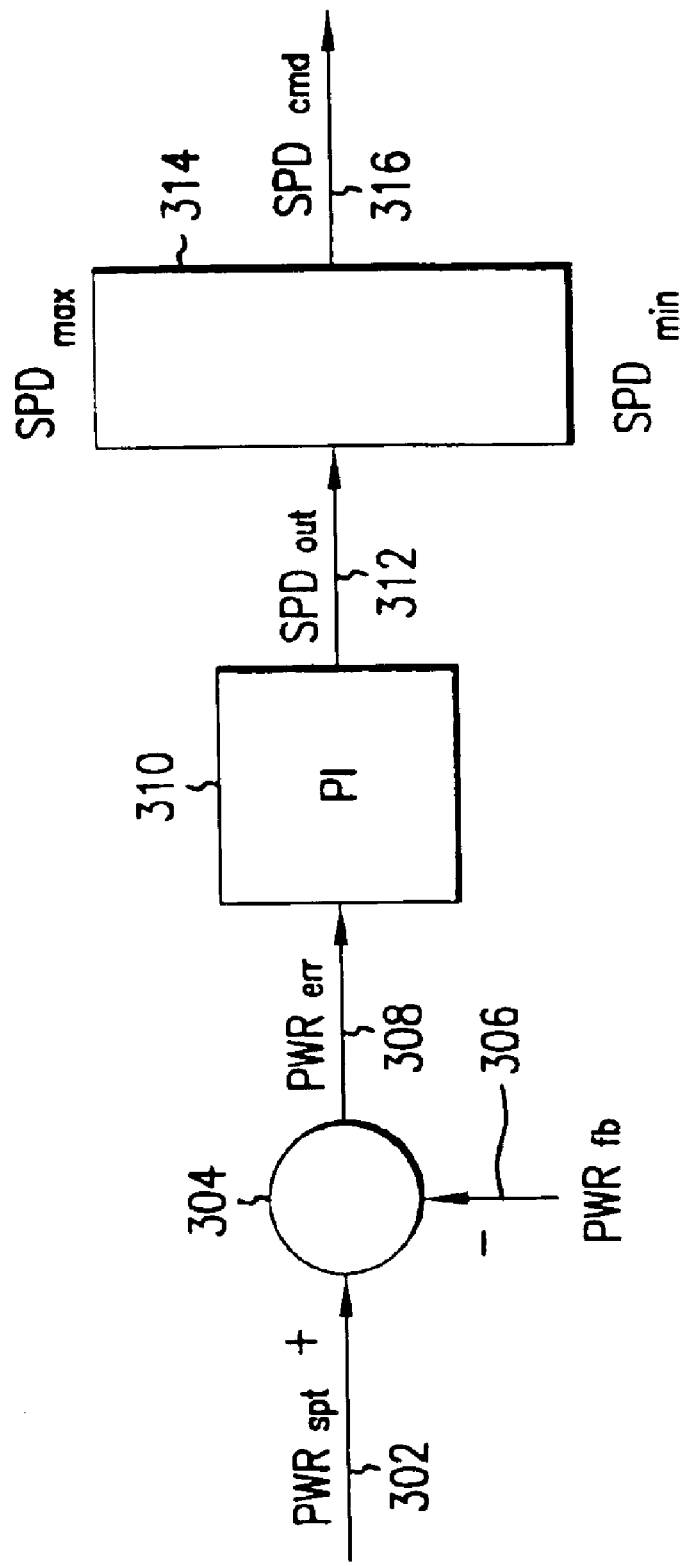
FIG. 12 is a block diagram of a power control mode loop for regulating the power producing potential of the turbine.

Referring to FIGS. 10–12, control loops 260, 282 and 300 are used to regulate engine controls. These loops include exhaust gas temperature (EGT) control (FIG. 10), speed control (FIG. 11) and power control (FIG. 12). All three of the control loops 260, 282 and 300 are used individually and collectively by main CPU 232 to provide the dynamic control and performance required of power controller 230. These loops are joined together for different modes of operation.

The open-loop light off control algorithm is a programmed command of the fuel device used to inject fuel until combustion begins. In a typical configuration, main CPU 232 takes a snap shot of the engine EGT and begins commanding the fuel device from about 0% to 25% of full command over about 5 seconds. Engine light is declared when the engine EGT rises about 28° C. (50° F.) from the initial snap shot.

Referring to FIG. 10, EGT control mode loop 260 provides various fuel output commands to regulate the temperature of the turbine. Engine speed signal 262 is used to determine the maximum EGT setpoint temperature 266 in accordance with predetermined setpoint temperature values. EGT setpoint temperature 266 is compared by comparator 268 against feedback EGT signal 270 to determine error signal 272, which is then applied to a proportional-integral (PI) algorithm 274 for determining the fuel command required to regulate EGT at the setpoint. Maximum/minimum fuel limits 278 are used to limit EGT control algorithm fuel command output 276 to protect from integrator windup. Resultant output signal 280 is a regulated EGT signal fuel flow command. In operation, EGT control mode loop 260 operates at about a 100 ms rate.

Referring to FIG. 11, speed control mode loop 282 provides various fuel output commands to regulate the rotating speed of the turbine. Feedback speed signal 288 is read and compared by comparator 286 against setpoint speed signal 284 to determine error signal 290, which is then applied to PI algorithm 292 to determine the fuel command required to regulate engine speed at the setpoint. EGT control (FIG. 10) and maximum/minimum fuel limits are used in conjunction with the speed control algorithm 282 to protect output signal 294 from surge and flame out conditions. Resultant output signal 298 is a regulated turbine speed fuel flow command. In a typical implementation, speed control mode loop 282 operates at about a 20 ms rate.

Referring to FIG. 12, power control mode loop 300 regulates the power producing potential of the turbine. Feedback power signal 306 is read and compared by comparator 304 against setpoint power signal 302 to determine error signal 308, which is then applied to PI algorithm 310 to determine the speed command required to regulate output power at the setpoint. Maximum/minimum speed limits are used to limit the power control algorithm speed command output to protect output signal 312 from running into over speed and under speed conditions. Resultant output signal 316 is a regulated power signal turbine speed command. In a typical implementation, the maximum operating speed of the turbine is generally 96,000 RPM and the minimum operating speed of the turbine is generally 45,000 RPM. The loop operates generally at about a 500 ms rate.

Start Only Battery

Figure 14:
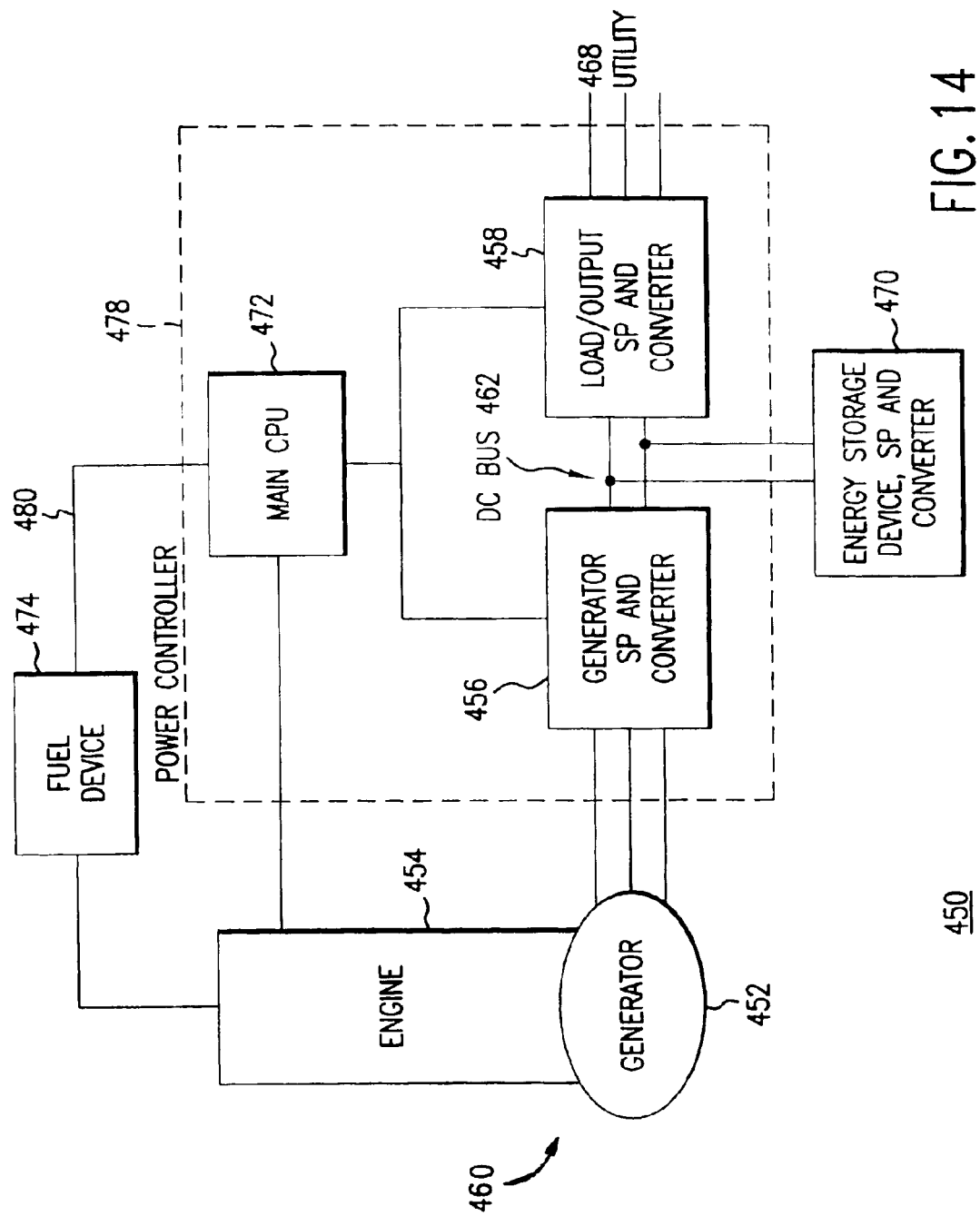
FIG. 14 is a block diagram of the power controller interfacing with a turbine and fuel device.

Referring to FIG. 14, energy storage device 470 may be a start only battery. In the DC bus voltage control mode, start only battery 470 provides energy to regulate voltage to the setpoint command. Main CPU 472 commands the bus voltage to control at different values depending on the configuration of power controller 478. In the state of charge (SOC) control mode, the start only battery system provides a recharging power demand when requested. Available recharging power is generally equivalent to maximum engine power less power being supplied to the output load and system parasitic loads. Main CPU 472 transmits a recharging power level that is the minimum of the original power demand and available recharging power.

Transient Battery

The transient battery provides the DC bus voltage control as described below as well as the state of charge (SOC) control mode described for the start only battery. The transient battery contains a larger energy storage device than the start only battery.

DC Bus Voltage Control

DC bus 462 supplies power for logic power, external components and system power output. TABLE 1 defines the setpoint the bus voltage is to be controlled at based on the output power configuration of power controller 478:

TABLE 1

| POWER OUTPUT | SETPOINT |
| --- | --- |
| 480/400 VAC Output | 800 Vdc |
| 240/208 VAC Output | 400 Vdc |

In the various operating modes, power controller 478 will have different control algorithms responsible for managing the DC bus voltage level. Any of the battery options 470 as well as SPs 456 and 458 have modes that control power flow to regulate the voltage level of DC bus 462. Under any operating circumstances, only one device is commanded to a mode that regulates DC bus 462. Multiple algorithms would require sharing logic that would inevitably make system response slower and software more difficult to comprehend.

System States

Figure 13:
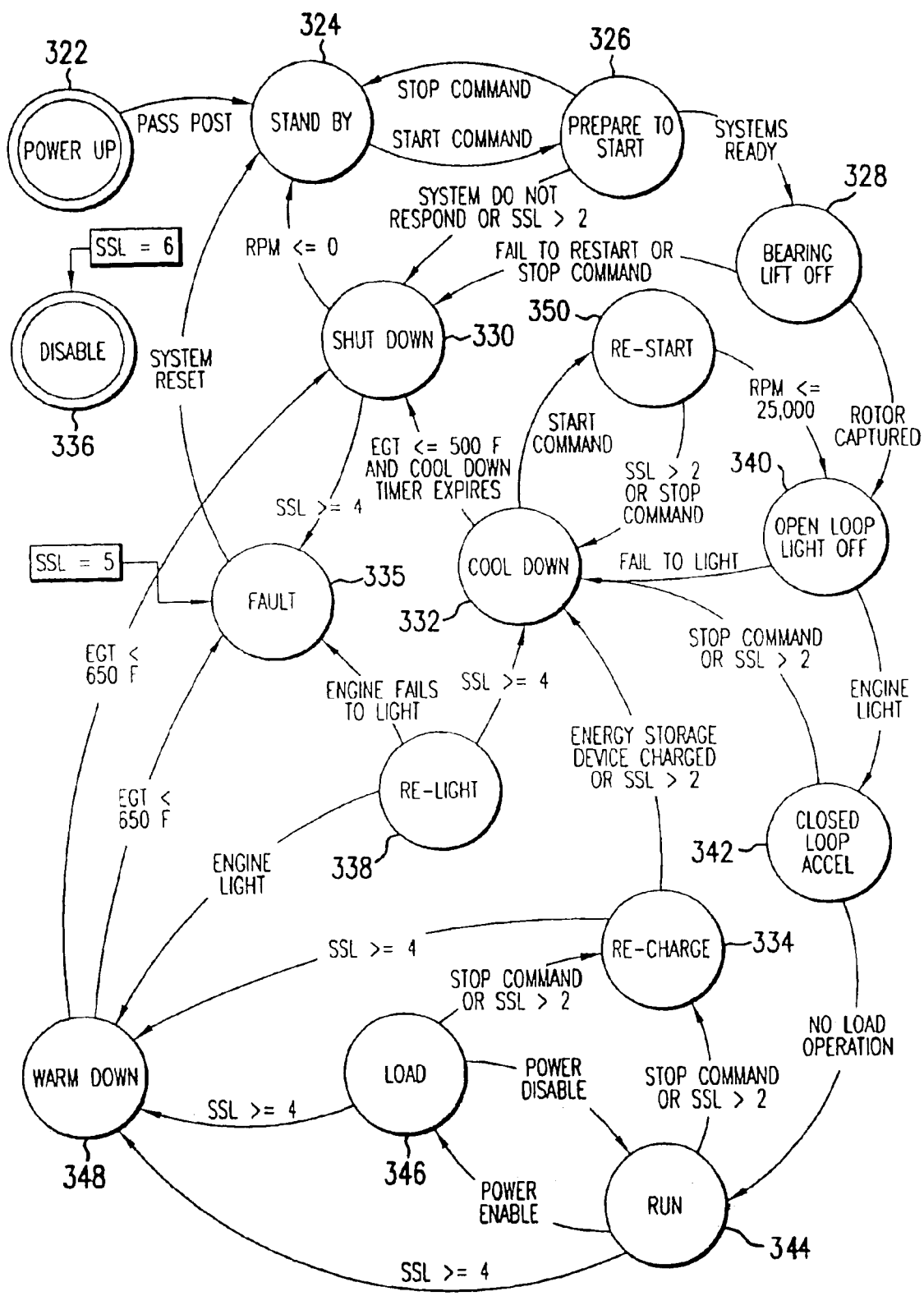
FIG. 13 is a state diagram showing various operating states of the power controller.

Referring to FIG. 13, state diagram 320 showing various operating states of power controller 478 is illustrated. Sequencing the system through the entire operating procedure requires power controller 478 to transition through the operating states defined in TABLE 2.

TABLE 2

| STATE # | SYSTEM STATE | DESCRIPTION |
| --- | --- | --- |
| 0 | Power Up | Performs activities of initializing and testing the system. |
| 1 | Stand By | Connects power to bus and continues system monitoring while waiting for a start command. |
| 2 | Prepare to start | Initializes any external devices preparing for the start procedure. |
| 3 | Bearing Lift Off | Configures the system and commands the engine to be rotated to a predetermined RPM, such as 25,000 RPM. |
| 4 | Open Loop Light Off | Turns on ignition system and commands fuel open loop to light the engine. |
| 5 | Closed Loop Acceleration | Continues motoring and closed fuel control until the system reaches the no load state. |
| 6 | Run | Engine operates in a no load self-sustaining state producing power only to operate the controller. |
| 7 | Load | Converter output contactor is closed and system is producing power. |
| 8 | Re-Charge | System operates off of fuel only and produces power for recharging energy storage device if installed. |
| 9 | Cooldown | System is motoring engine to reduce EGT before shutting down. |
| 10 | Re-Start | Reduces engine speed to begin open loop light when a start command is received in the cooldown state. |
| 11 | Re-Light | Performs a turbine re-light in transition from the cooldown to warmdown state. Allows continued engine cooling when motoring is no longer possible. |
| 12 | Warmdown | Sustains turbine operation with fuel at a predetermined RPM, such as 50,000 RPM, to cool when engine motoring is not possible. |
| 13 | Shutdown | Reconfigures the system after a cooldown to enter the stand by state. |
| 14 | Fault | Turns off all outputs when presence of fault which disables power conversion exists. Logic power is still available for interrogating system faults. |
| 15 | Disable | Fault has occurred where processing may no longer be possible. All system operation is disabled. |

Main CPU 472 begins execution in the "power up" state 322 after power is applied. Transition to the "stand by" state 324 is performed upon successfully completing the tasks of the "power up" state 322. Initiating a start cycle transitions the system to the "prepare to start" state 326 where all system components are initialized for an engine start. The engine then sequences through start states and onto the "run/load" state 328. To shutdown the system, a stop command which sends the system into either "warm down" or "cool down" state 332 is initiated. Systems that have a battery may enter the "re-charge" state 334 prior to entering the "warm down" or "cool down" state 332. When the system has finally completed the "warm down" or "cool down" process 332, a transition through the "shut down" state 330 will be made before the system re-enters the "standby" state 324 awaiting the next start cycle. During any state, detection of a fault with a system severity level indicating the system should not be operated will transition the system state to "fault" state 335. Detection of faults that indicate a processor failure has occurred will transition the system to the "disable" state 336.

One skilled in the art will recognize that in order to accommodate each mode of operation, the state diagram is multidimensional to provide a unique state for each operating mode. For example, in the "prepare to start" state 326, control requirements will vary depending on the selected operating mode. Therefore, the presence of a stand-alone "prepare to start" state 326, stand-alone transient "prepare to start" state 326, utility grid connect "prepare to start" state 326 and utility grid connect transient "prepare to start" state 326 will be required. Each combination is known as a system configuration (SYSCON) sequence. Main CPU 472 identifies each of the different system configuration sequences in a 16-bit word known as a SYSCON word, which is a bit-wise construction of an operating mode and system state number. In a typical configuration, the system state number is packed in bits 0 through 11. The operating mode number is packed in bits 12 through 15. This packing method provides the system with the capability of sequence through 4096 different system states in 16 different operating modes.

Separate "power up" 322, "re-light" 338, "warm down" 348, "fault" 335 and "disable" 336 states are not required for each mode of operation. The contents of these states are mode independent.

"Power Up" State

Operation of the system begins in the "power up" state 322 once application of power activates main CPU 472. Once power is applied to power controller 478, all the hardware components will be automatically reset by hardware circuitry. Main CPU 472 is responsible for ensuring the hardware is functioning correctly and configuring the components for operation. Main CPU 472 also initializes its own internal data structures and begins execution by starting the Real-Time Operating System (RTOS). Successful completion of these tasks directs transition of the software to the "stand by" state 324. Main CPU 472 performs these procedures in the following order:

1. Initialize main CPU 472
2. Perform RAM Test
3. Perform FLASH Checksum
4. Start RTOS
5. Run Remaining POST
6. Initialize SPI Communications
7. Verify Generator SP Checksum
8. Verify Converter SP Checksum
9. Initialize IntraController Communications
10. Resolve External Device Addresses
11. Look at Input Line Voltage 12. Determine Mode
13. Initialize Maintenance Port
14. Initialize User Port
15. Initialize External Option Port
16. Initialize InterController
17. Chose Master/Co-Master
18. Resolve Addressing
19. Transition to Stand By State (depends on operating mode)

"Stand By" State

Main CPU 472 continues to perform normal system monitoring in the "stand by" state 324 while it waits for a start command signal. Main CPU 472 commands either energy storage device 470 or utility 468 to provide continuous power supply. In operation, main CPU 472 will often be left powered on waiting to be started or for troubleshooting purposes. While main CPU 472 is powered up, the software continues to monitor the system and perform diagnostics in case any failures should occur. All communications will continue to operate providing interface to external sources. A start command will transition the system to the "prepare to start" state 326.

"Prepare to Start" State

Main CPU 472 prepares the control system components for the engine start process. Many external devices may require additional time for hardware initialization before the actual start procedure can commence. The "prepare to start" state 326 provides those devices the necessary time to perform initialization and send acknowledgment to the main CPU 472 that the start process can begin. Once also systems are ready to go, the software shall transition to the "bearing lift off" state 328.

"Bearing Lift Off" State

Main CPU 472 commands generator SP 456 to motor the engine 454 from typically about 0 to 25,000 RPM to accomplish the bearing lift off procedure. A check is performed to ensure the shaft is rotating before transition to the next state occurs.

"Open Loop Light Off" State

Once the motor 452 reaches its liftoff speed, the software ensures that combustion is occurring in the turbine. In a typical configuration, main CPU 472 commands generator SP 456 to motor the engine 454 to a dwell speed of about 25,000 RPM. Execution of the open loop light off state 340 starts combustion. Main CPU 472 then verifies that the engine 454 has not met the "fail to light" criteria before transitioning to the "closed loop accel" state 342.

"Closed Loop Accel" State

Main CPU 472 sequences engine 454 through a combustion heating process to bring the engine 454 to a self-sustaining operating point. In a typical configuration, commands are provided to generator SP 456 commanding an increase in engine speed to about 45,000 RPM at a rate of about 4000 RPM/sec. Fuel controls are executed to provide combustion and engine heating. When engine 454 reaches "no load" (requires no electrical power to motor), the software transitions to "run" state 344.

"Run" State

Main CPU 472 continues operation of control algorithms to operate the engine at no load. Power may be produced from engine 454 for operating control electronics and recharging any energy storage device 470 for starting. No power is output from load converter 458. A power enable signal transitions the software into "load" state 346. A stop command transitions the system to begin shutdown procedures (may vary depending on operating mode).

"Load" State

Main CPU 472 continues operation of control algorithms to operate the engine 454 at the desired load. Load commands are issued through the communications ports, display or system loads. A stop command transitions main CPU 472 to begin shutdown procedures (may vary depending on operating mode). A power disable signal can transition main CPU 472 back to "run" state 344.

"Re-Charge" State

Systems that have an energy storage option may be required to charge energy storage device 470 to maximum capacity before entering the "warmdown" 348 or "cooldown" 332 states. During the "re-charge" state 334 of operation, main CPU 472 continues operation of the turbine producing power for battery charging and controller supply. No output power is provided. When the energy storage device 470 has charged, the system transitions to either the "cooldown" 332 or "warmdown" 348 state depending on system fault conditions.

"Cool Down" State

"Cool down" state 332 provides the ability to cool the turbine after operation and a means of purging fuel from the combustor. After normal operation, software sequences the system into "cool down" state 332. In a typical configuration, engine 454 is motored to a cool down speed of about 45,000 RPM. Airflow continues to move through engine 454 preventing hot air from migrating to mechanical components in the cold section. This motoring process continues until the engine EGT falls below a cool down temperature of about 193° C. (380° F.). Cool down may be entered at much lower than the final cool down temperature when engine 454 fails to light. The engine's combustor requires purging of excess fuel which may remain. The software always operates the cool down cycle for a minimum purge time of 60 seconds. This purge time ensures remaining fuel is evacuated from the combustor. Completion of this process transitions the system into the "shutdown" state 330. For user convenience, the system does not require a completion of the enter "cooldown" state 332 before being able to attempt a restart. Issuing a start command transitions the system into the "restart" state 350.

"Restart" State

Engine 454 is configured from the "cool down" state 332 before a restart. In a typical configuration, the software lowers the engine speed to about 25,000 RPM at a rate of 4,000 RPM/sec. Once the engine speed has reached this level, the software transitions the system into the "open loop light off" state to perform the actual engine start.

"Shutdown" State

During the "shutdown" state 330, the engine rotor is brought to rest and system outputs are configured for idle operation. In a typical configuration, the software commands the rotor to rest by lowering the engine speed at a rate of 2,000 RPM/sec or no load condition, whichever is faster. Once the speed reaches about 14,000 RPM, the generator SP is commanded to reduce the shaft speed to about 0 RPM in less than 1 second.

"Re-Light" State

When a system fault occurs where no power is provided from the utility or energy storage device 470, the software re-ignites combustion to perform a warm down. The generator SP is configured to regulate voltage (power) for the internal DC bus. Fuel is added as defined in the open loop light off fuel control algorithm to ensure that combustion occurs. Detection of engine light will transition the system to "warm down" state 348.

"Warm Down" State

Fuel is provided when no electric power is available to operate engine 454 at a no load condition to lower the operating temperature in "warm down" state 348. In a typical configuration, engine speed is operated at about 50,000 RPM by supplying fuel through the speed control algorithm. Engine temperatures less than about 343° C. (650° F.) cause the system to transition to "shutdown" state 330.

"Fault" State

The present invention disables all outputs placing the system in a safe configuration when faults that prohibit safe operation of the turbine system are present. Operation of system monitoring and communications will continue if the energy is available.

"Disable" State

The system disables all outputs placing the system in a safe configuration when faults that prohibit safe operation of the turbine system are present. System monitoring and communications will most likely not continue.

Modes of Operation

The turbine works in two major modes—utility grid-connect and stand-alone. In the utility grid-connect mode, the electric power distribution system i.e., the utility grid, supplies a reference voltage and phase, and the turbine supplies power in synchronism with the utility grid. In the stand-alone mode, the turbine supplies its own reference voltage and phase, and supplies power directly to the load. The power controller switches automatically between the modes.

Within the two major modes of operation are sub-modes. These modes include stand-alone black start, stand-alone transient, utility grid connect and utility grid connect transient. The criteria for selecting an operating mode is based on numerous factors, including but not limited to, the presence of voltage on the output terminals, the black start battery option, and the transient battery option.

Referring to FIG. 14, generator converter 456 and load converter 458 provide an interface for energy source 460 and utility 468, respectively, to DC bus 462. For illustrative purposes, energy source 460 is a turbine including engine 454 and generator 452. Fuel device 474 provides fuel via fuel line 476 to engine 454. Generator converter 456 and load converter 458 operate as customized bi-directional switching converters under the control of controller 472. In particular, controller 472 reconfigures the generator converter 456 and load converter 458 into different configurations to provide for the various modes of operation. These modes include stand-alone black start, stand-alone transient, utility grid connect and utility grid connect transient as discussed in detail below. Controller 472 controls the way in which generator 452 and utility 468 sinks or sources power, and DC bus 462 is regulated at any time. In this way, energy source 460, utility/load 468 and energy storage device 470 can be used to supply, store and/or use power in an efficient manner. Controller 472 provides command signals via line 479 to engine 454 to determine the speed of turbine 460. The speed of turbine 460 is maintained through generator 452. Controller 472 also provides command signals via control line 480 to fuel device 474 to maintain the EGT of the engine 454 at its maximum efficiency point. Generator SP 456 is responsible for maintaining the speed of the turbine 460, by putting current into generator 452 or pulling current out of generator 452.

Stand-Alone Black Start

Referring to FIG. 14, in the stand-alone black start mode, energy storage device 470, such as a battery, is provided for starting purposes while energy source 460, such as a turbine including engine 454 and generator 452, supplies all transient and steady state energy. Referring to TABLE 3, controls for a typical stand-alone black start mode are shown.

TABLE 3

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | — |
| Stand By | — | — | — | DC Bus |
| Prepare to Start | — | — | — | DC Bus |
| Bearing Lift Off | — | RPM | — | DC Bus |
| Open Loop Light Off | Open Loop Light | RPM | — | DC Bus |
| Closed Loop Accel | EGT | RPM | — | DC Bus |
| Run | Speed | DC Bus | — | SOC |
| Load | Speed | DC Bus | Voltage | SOC |
| Recharge | Speed | DC Bus | — | SOC |
| Cool Down | — | RPM | — | DC Bus |
| Restart | — | RPM | — | DC Bus |
| Shutdown | — | RPM | — | DC Bus |
| Re-light | Speed | DC Bus | — | — |
| Warm Down | Speed | DC Bus | — | — |
| Fault | — | — | — | — |
| Disable | — | — | — | — |

Stand-Alone Transient

In the stand-alone transient mode, storage device 470 is provided for the purpose of starting and assisting the energy source 460, in this example the turbine, to supply maximum rated output power during transient conditions. Storage device 470, typically a battery, is always attached to DC bus 462 during operation, supplying energy in the form of current to maintain the voltage on DC bus 462. Converter/SP 458 provides a constant voltage source when producing output power. As a result, load 468 is always supplied the proper AC voltage value that it requires. Referring to TABLE 4, controls for a typical stand-alone transient mode are shown.

TABLE 4

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | — |
| Stand By | — | — | — | DC Bus |
| Prepare to Start | — | — | — | DC Bus |
| Bearing Lift Off | — | RPM | — | DC Bus |
| Open Loop Light Off | Open Loop Light | RPM | — | DC Bus |
| Closed Loop Accel | EGT | RPM | — | DC Bus |
| Run | Power & EGT | RPM | — | DC Bus |
| Load | Power & EGT | RPM | Voltage | DC Bus |
| Recharge | Power & EGT | RPM | — | DC Bus |
| Cool Down | — | RPM | — | DC Bus |
| Restart | — | RPM | — | DC Bus |
| Shutdown | — | RPM | — | DC Bus |
| Re-light | Speed | DC Bus | — | — |
| Warm Down | Speed | DC Bus | — | — |
| Fault | — | — | — | — |
| Disable | — | — | — | — |

Utility Grid Connect

Referring to FIG. 14, in the utility grid connect mode, the energy source 460, in this example the turbine is connected to the utility grid 468 providing load leveling and management where transients are handled by the utility grid 468. The system operates as a current source, pumping current into utility 468. Referring to TABLE 5, controls for a typical utility grid connect mode are shown.

TABLE 5

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | N/A |
| Stand By | — | — | — | N/A |
| Prepare to Start | — | — | DC Bus | N/A |
| Bearing Lift Off | — | RPM | DC Bus | N/A |
| Open Loop Light Off | Open Loop Light | RPM | DC Bus | N/A |
| Closed Loop Accel | EGT | RPM | DC Bus | N/A |
| Run | Power & EGT | RPM | DC Bus | N/A |
| Load | Power & EGT | RPM | DC Bus | N/A |
| Recharge | N/A | N/A | N/A | N/A |
| Cool Down | — | RPM | DC Bus | N/A |
| Restart | — | RPM | DC Bus | N/A |
| Shutdown | — | RPM | DC Bus | N/A |
| Re-light | Speed | DC Bus | — | N/A |
| Warm Down | Speed | DC Bus | — | N/A |
| Fault | — | — | — | N/A |
| Disable | — | — | — | N/A |

Utility Grid Connect Transient

In the utility grid connect transient mode, the energy source 460, in this example the turbine, is connected to the utility grid 468 providing load leveling and management. The turbine that is assisted by energy storage device 470, typically a battery, handles transients. The system operates as a current source, pumping current into utility 468 with the assistance of energy storage device 470. Referring to TABLE 6, controls for a typical utility grid connect transient mode are shown.

TABLE 6

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | — |
| Stand By | — | — | — | DC Bus |
| Prepare to Start | — | — | — | DC Bus |
| Bearing Lift Off | — | RPM | — | DC Bus |
| Open Loop Light Off | Open Loop Light | RPM | — | DC Bus |
| Closed Loop Accel | EGT | RPM | — | DC Bus |
| Run | Power & EGT | RPM | — | DC Bus |
| Load | Power & EGT | RPM | Current | DC Bus |
| Recharge | Power & EGT | RPM | — | DC Bus |
| Cool Down | — | RPM | — | DC Bus |
| Restart | — | RPM | — | DC Bus |
| Shutdown | — | RPM | — | DC Bus |
| Re-light | Speed | DC Bus | — | — |
| Warm Down | Speed | DC Bus | — | — |
| Fault | — | — | — | — |
| Disable | — | — | — | — |

Multi-Pack Operation

In accordance with the present invention, the power controller can operate in a single or multi-pack configuration. In particular, power controller, in addition to being a controller for a single turbogenerator, is capable of sequencing multiple systems as well. Referring to FIG. 15, for illustrative purposes, multi-pack system 510 including three power controllers 518, 520 and 522 is shown. The ability to control multiple controllers 518, 520 and 522 is made possible through digital communications interface and control logic contained in each controller's main CPU (not shown).

Two communication busses 530 and 534 are used to create the intercontroller digital communications interface for multi-pack operation. One bus 534 is used for slower data exchange while the other bus 530 generates synchronization packets at a faster rate. In a typical implementation, for example, an IEEE-502.3 bus links each of the controllers 518, 520 and 522 together for slower communications including data acquisition, start, stop, power demand and mode selection functionality. An RS485 bus links each of the systems together providing synchronization of the output power waveforms.

One skilled in the art will recognize that the number of power controllers that can be connected together is not limited to three, but rather any number of controllers can be connected together in a multi-pack configuration. Each power controller 518, 520 and 522 includes its own energy storage device 524, 526 and 528, respectively, such as a battery. In accordance with another embodiment of the invention, power controllers 518, 520 and 522 can all be connected to the same single energy storage device (not shown), typically a very large energy storage device which would be rated too big for an individual turbine. A distribution panel, typically comprised of circuit breakers, provides for distribution of energy.

Multi-pack control logic determines at power up that one controller is the master and the other controllers become slave devices. The master is in charge of handling all user-input commands, initiating all inter-system communications transactions, and dispatching units. While all controllers 518, 520 and 522 contain the functionality to be a master, to alleviate control and bus contention, one controller is designated as the master.

At power up, the individual controllers 518, 520 and 522 determine what external input devices they have connected. When a controller contains a minimum number of input devices it sends a transmission on intercontroller bus 530 claiming to be master. All controllers 518, 520 and 522 claiming to be a master begin resolving who should be master. Once a master is chosen, an address resolution protocol is executed to assign addresses to each slave system. After choosing the master and assigning slave addresses, multi-pack system 510 can begin operating.

A co-master is also selected during the master and address resolution cycle. The job of the co-master is to act like a slave during normal operations. The co-master should receive a constant transmission packet from the master indicating that the master is still operating correctly. When this packet is not received within a safe time period, 20 ms for example, the co-master may immediately become the master and take over master control responsibilities.

Logic in the master configures all slave turbogenerator systems. Slaves are selected to be either utility grid-connect (current source) or standalone (voltage source). A master controller, when selected, will communicate with its output converter logic (converter SP) that this system is a master. The converter SP is then responsible for transmitting packets over the intercontroller bus 530, synchronizing the output waveforms with all slave systems. Transmitted packets will include at least the angle of the output waveform and error-checking information with transmission expected every quarter cycle to one cycle.

Master control logic will dispatch units based on one of three modes of operation: (1) peak shaving, (2) load following, or (3) base load. Peak shaving measures the total power consumption in a building or application using a power meter, and the multi-pack system 510 reduces the utility consumption of a fixed load, thereby reducing the utility rate schedule and increasing the overall economic return of the turbogenerator. Load following is a subset of peak shaving where a power meter measures the total power consumption in a building or application and the multi-pack system 10 reduces the utility consumption to zero load. In base load, the multi-pack system 10 provides a fixed load and the utility supplements the load in a building or application. Each of these control modes require different control strategies to optimize the total operating efficiency.

A minimum number of input devices are typically desired for a system 510 to claim it is a master during the master resolution process. Input devices that are looked for include a display panel, an active RS232 connection and a power meter connected to the option port. Multi-pack system 510 typically requires a display panel or RS232 connection for receiving user-input commands and power meter for load following or peak shaving.

In accordance with the present invention, the master control logic dispatches controllers based on operating time. This would involve turning off controllers that have been operating for long periods of time and turning on controllers with less operating time, thereby reducing wear on specific systems.

Utility Grid Analysis and Transient Ride Through

Figure 16:
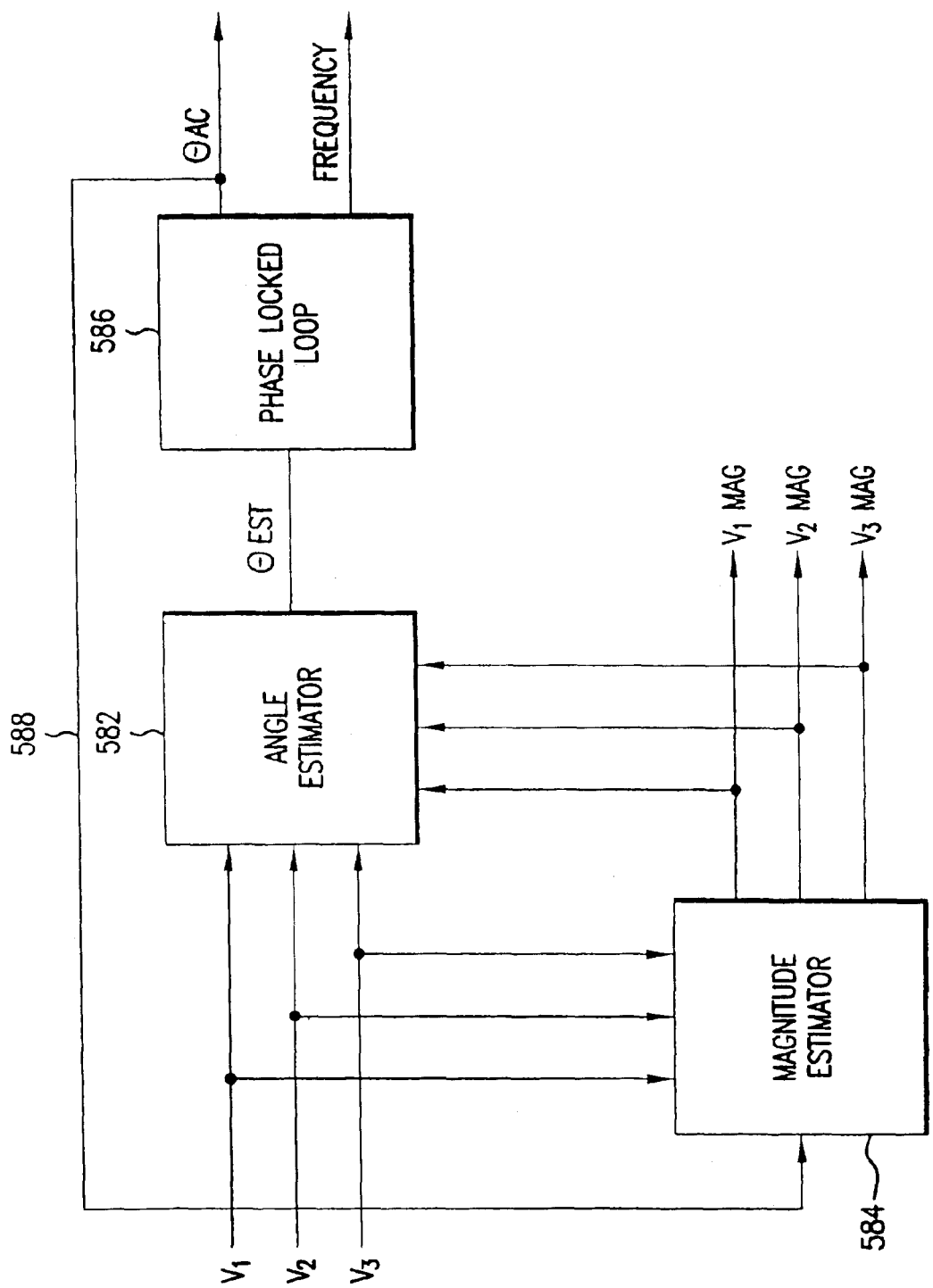
FIG. 16 is a block diagram of a utility grid analysis system for the power controller according to the present invention.
Figure 17:
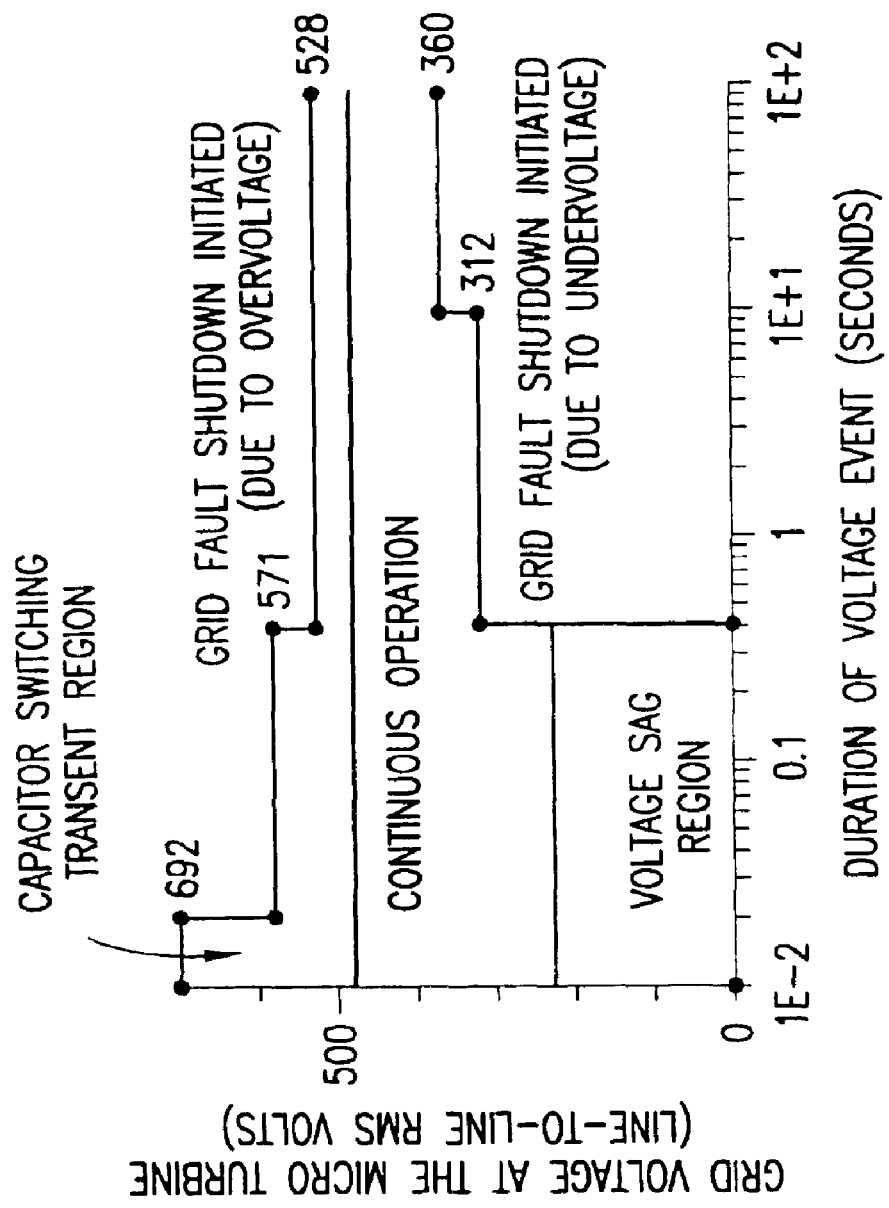
FIG. 17 is a graph of voltage against time for the utility grid analysis system illustrated in FIG. 16.
Figure 18:
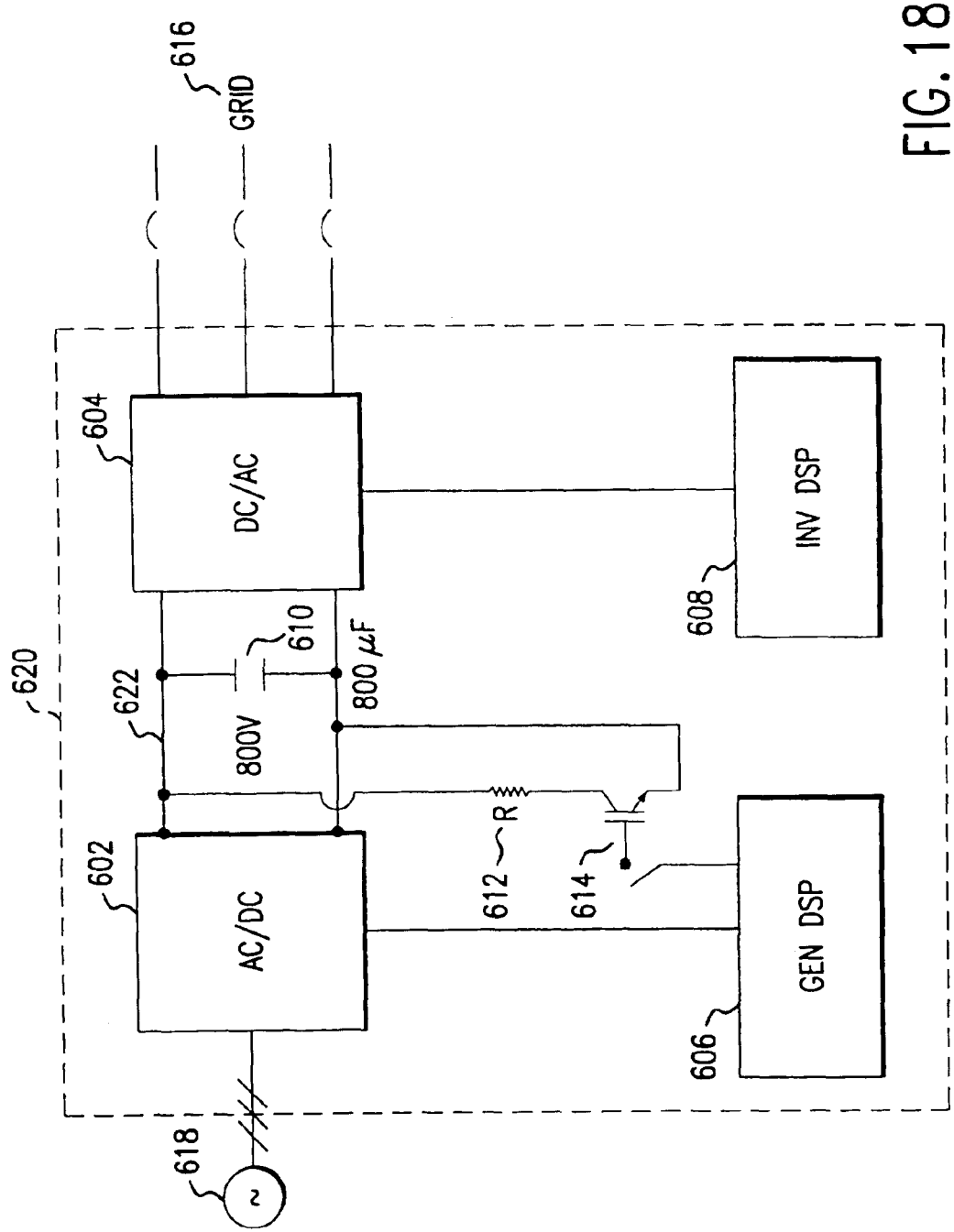
FIG. 18 is a diagram of the power controller shown in FIG. 16, including brake resistor.

Referring to FIGS. 16–18, transient handling system 580 for power controller 620 is illustrated. Transient handling system 580 allows power controller 620 to ride through transients which are associated with switching of correction capacitors on utility grid 616 which causes voltage spikes followed by ringing. Transient handling system 580 also allows ride through of other faults, including but not limited to, short circuit faults on utility grid 616, which cleared successfully, cause voltage sags. Transient handling system 580 is particularly effective towards handling transients associated with digital controllers, which generally have a slower current response rate due to A/D conversion sampling. During a transient, a large change in the current can occur in between A/D conversions. The high voltage impulse caused by transients typically causes an over current in digital power controllers.

As is illustrated in FIG. 17, a graph 590 showing transients typically present on utility grid 616 is shown. The duration of a voltage transient, measured in seconds, is shown on the x-axis and its magnitude, measured in volts, is shown on the y-axis. A capacitor switching transient, such as shown at 592, which is relatively high in magnitude (up to about 200%) and short in duration (somewhere between 1 and 20 milliseconds) could be problematic to operation of a power controller.

Referring to FIGS. 16–18, changes on utility grid 616 are reflected as changes in the magnitude of the voltage. In particular, the type and seriousness of any fault or event on utility grid 616 can be determined by magnitude estimator 584, which monitors the magnitude and duration of any change on utility grid 616.

In accordance with the present invention, the effect of voltage transients can be minimized by monitoring the current such that when it exceeds a predetermined level, switching is stopped so that the current can decay, thereby preventing the current from exceeding its predetermined level. The present invention thus takes advantage of analog over current detection circuits that have a faster response than transient detection based on digital sampling of current and voltage. Longer duration transients indicate abnormal utility grid conditions. These must be detected so power controller 620 can shut down in a safe manner. In accordance with the present invention, algorithms used to operate power controller 620 provide protection against islanding of power controller 620 in the absence of utility-supplied grid voltage. Near short or near open islands are detected within milliseconds through loss of current control. Islands whose load is more closely matched to the power controller output will be detected through abnormal voltage magnitudes and frequencies as detected by magnitude estimator 584.

In particular, referring to FIG. 18, power controller 620 includes brake resistor 612 connected across DC bus 622. Brake resistor 612 acts as a resistive load, absorbing energy when converter SP 608 is turned off. In operation, when converter SP 608 is turned off, power is no longer exchanged with utility grid 616, but power is still being received from the turbine, which is absorbed by brake resistor 612. The present invention detects the DC voltage between the generator and output converters 602 and 604. When the voltage starts to rise, brake resistor 612 is turned on to allow it to absorb energy.

In a typical configuration, AC generator 618 produces three phases of AC at variable frequencies. AC/DC converter 602 under the control of generator SP 606 converts the AC to DC which is then applied to DC bus 622 (regulated for example at 800 vDC) which is supported by capacitor 610 (for example, at 800 microfarads with two milliseconds of energy storage). AC/DC converter 604, under the control of converter SP 608, converts the DC into three-phase AC, and applies it to utility grid 616. In accordance with the present invention, current from DC bus 622 can by dissipated in brake resistor 612 via modulation of switch 614 operating under the control of generator SP 606. Switch 614 may be an IGBT switch, although one skilled in the art will recognize that other conventional or newly developed switches may be utilized as well.

Generator SP 606 controls switch 614 in accordance with the magnitude of the voltage on DC bus 622. The bus voltage of DC bus 622 is typically maintained by converter SP 608, which shuttles power in and out of utility grid 616 to keep DC bus 622 regulated at, for example, 800 vDC. When converter SP 608 is turned off, it no longer is able to maintain the voltage of DC bus 622, so power coming in from the generator causes bus voltage of DC bus 622 to rise quickly. The rise in voltage is detected by generator SP 606, which turns on brake resistor 612 and modulates it on and off until the bus voltage is restored to its desired voltage, for example, 800 vDC. Converter SP 608 detects when the utility grid transient has dissipated, i.e., AC current has decayed to zero and restarts the converter side of power controller 620. Brake resistor 612 is sized so that it can ride through the transient and the time taken to restart the converter 604.

Referring to FIGS. 16 and 18, in accordance with the present invention, both the voltage and zero crossings (to determine where the AC waveform of utility grid 616 crosses zero) are monitored to provide an accurate model of utility grid 616. Utility grid analysis system includes angle estimator 582, magnitude estimator 584 and phase locked loop 586. The present invention continuously monitors utility grid voltage and, based on these measurements, estimates the utility grid angle, thus facilitating recognition of under/over voltages and sudden transients. Current limits are set to disable DC/AC converter 604 when current exceeds a maximum and wait until current decays to an acceptable level. The result of measuring the current and cutting it off is to allow DC/AC converter 604 to ride through transients better. Thus when DC/AC converter 604 is no longer exchanging power with utility grid 616, power is dissipated in brake resistor 612.

In accordance with the present invention, converter SP 608 is capable of monitoring the voltage and current at utility grid 616 simultaneously. In particular, power controller 620 includes a utility grid analysis algorithm. One skilled in the art will recognize that estimates of the utility grid angle and magnitude may be derived via conventional algorithms or means. The true utility grid angle θAC, which is the angle of the generating source, cycles through from 0 to 2π and back to 0, for example, at a rate of 60 Hertz. The voltage magnitude estimates of the three phases are designated V1 mag, V2 mag and V3 mag and the voltage measurement of the three phases are designated V1, V2 and V3.

A waveform, constructed based upon the estimates of the magnitude and angle for each phase, indicates what a correct measurement would look like. For example, using the first of the three phase voltages, the cosine of the true utility grid angle θAC is multiplied by the voltage magnitude estimate V1 mag, with the product being a cosine-like waveform. Ideally, the product would be equal to the voltage measurement V1.

Feedback loop 588 uses the difference between the absolute magnitude of the measurement of V1 and of the constructed waveform to adjust the magnitude of the magnitude estimate V1 mag. One skilled in the art will recognize that the other two phases of the three-phase signal can be adjusted similarly, with different angle templates corresponding to different phases of the signal. Thus, magnitude estimate VI mag and angle estimate θEST are used to update magnitude estimate V1 mag. Voltage magnitude estimates V1 mag, V2 mag and V3 mag are steady state values used in a feedback configuration to track the magnitude of voltage measurements V1, V2 and V3. By dividing the measured voltages VI by the estimates of the magnitude V1 mag, the cosine of the angle for the first phase can be determined (the cosine of the angles of the other signals will be similarly determined).

In accordance with the present invention, the most advantageous estimate for the cosine of the angle, generally the one that is changing the most rapidly, is chosen to determine the instantaneous measured angle. In most cases, the phase that has an estimate for the cosine of an angle closest to zero is selected since it yields the greatest accuracy. Utility grid analysis system 580 thus includes logic to select which one of the cosines to use. The angle chosen is applied to angle estimator 582, from which an estimate of the instantaneous angle of utility grid 616 is calculated and applied to phase locked loop 586 to produce a filtered frequency. The angle is thus differentiated to form a frequency that is then passed through a low pass filter (not shown). Phase locked loop 586 integrates the frequency and also locks the phase of the estimated instantaneous angle θEST, which may have changed in phase due to differentiation and integration, to the phase of true utility grid angle θAC.

In a typical operation, when the phase changes suddenly on measured voltage V1, the algorithm of the present invention compares the product of the magnitude estimate V1 mag and the cosine of estimated utility grid angle θEST against the real magnitude multiplied by the cosine of a different angle. A sudden jump in magnitude would be realized.

Thus, three reasonably constant DC voltage magnitude estimates are generated. A change in one of those voltages indicates whether the transient present on utility grid 616 is substantial or not. One skilled in the art will recognize that there are a number of ways to determine whether a transient is substantial or not, i.e. whether abnormal conditions exist on the utility grid system, which require power controller 620 to shut down. A transient can be deemed substantial based upon the size of the voltage magnitude and duration. Examples of the criteria for shutting down power controller 620 are shown in FIG. 17. Detection of abnormal utility grid behavior can also be determined by examining the frequency estimate.

On detecting abnormal utility grid behavior, a utility grid fault shutdown is initiated. When system controller 620 initiates a utility grid fault shutdown, output contactor is opened within a predetermined period of time, for example, 100 msec, and the main fuel trip solenoid (not shown) is closed, removing fuel from the turbogenerator. A warm shutdown ensues during which control power is supplied from generator 618 as it slows down. In a typical configuration, the warm-down lasts about 1–2 minutes before the rotor (not shown) is stopped. The control software does not allow a restart until utility grid voltage and frequency arc within permitted limits.

Figure 19:
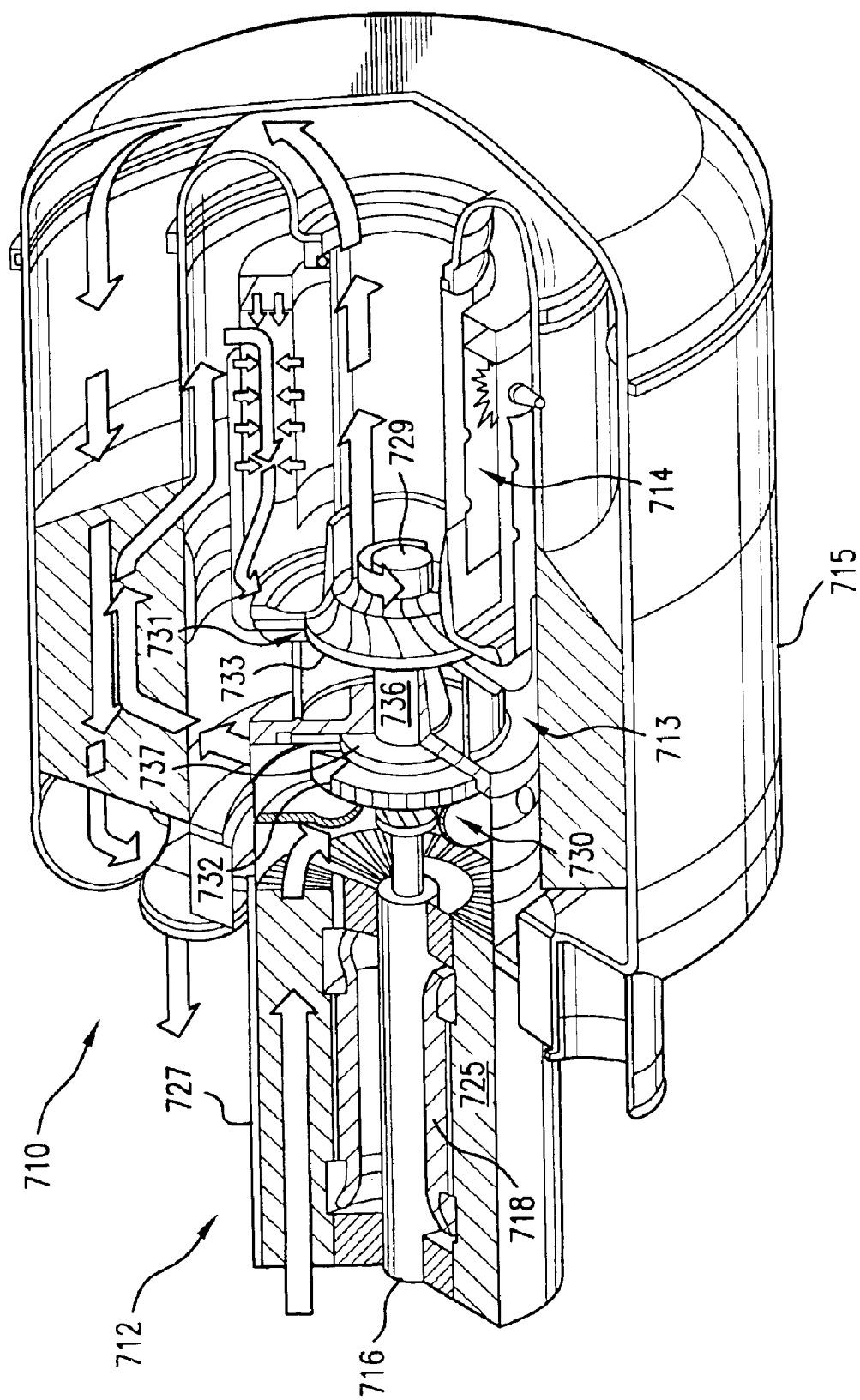
FIG. 19 is a perspective view, partially cut away, of a permanent magnet turbogenerator/motor utilizing the controller with an energy storage and discharge system of the present invention.

In accordance with another aspect of the invention, permanent magnet turbogenerator/motor 710 is illustrated in FIG. 19 as an example of a turbogenerator/motor utilizing the controller of the present invention. The permanent magnet turbogenerator/motor 710 generally comprises a permanent magnet generator 712, a power head 713, a combustor 714 and a recuperator (or heat exchanger) 715.

The permanent magnet generator 712 includes a permanent magnet rotor or sleeve 716, having a permanent magnet disposed therein, rotatably supported within a stator 718 by a pair of spaced journal bearings. Radial stator cooling fins 725 are enclosed in an outer cylindrical sleeve 727 to form an annular air flow passage which cools the stator 718 and thereby preheats the air passing through on its way to the power head 713.

The power head 713 of the permanent magnet turbogenerator/motor 710 includes compressor 730, turbine 731, and bearing rotor 736 through which the tie rod 729 passes. The compressor 730, having compressor impeller or wheel 732 which receives preheated air from the annular air flow passage in cylindrical sleeve 727 around the permanent magnet stator 718, is driven by the turbine 731 having turbine wheel 733 which receives heated exhaust gases from the combustor 714 supplied with air from recuperator 715. The compressor wheel 732 and turbine wheel 733 are rotatably supported by bearing shaft or rotor 736 having radially extending bearing rotor thrust disk 737. The bearing rotor 736 is rotatably supported by a single journal bearing within the center bearing housing while the bearing rotor thrust disk 737 at the compressor end of the bearing rotor 736 is rotatably supported by a bilateral thrust bearing. The bearing rotor thrust disk 737 is adjacent to the thrust face at the compressor end of the center bearing housing while a bearing thrust plate is disposed on the opposite side of the bearing rotor thrust disk 737 relative to the center housing thrust face.

Intake air is drawn through the permanent magnet generator 712 by the compressor 730 which increases the pressure of the air and forces it into the recuperator 715. In the recuperator 715, exhaust heat from the turbine 731 is used to preheat the air before it enters the combustor 714 where the preheated air is mixed with fuel and burned. The combustion gases are then expanded in the turbine 731 which drives the compressor 730 and the permanent magnet rotor 716 of the permanent magnet generator 712 which is mounted on the same shaft as the turbine 731. The expanded turbine exhaust gases are then passed through the recuperator 715 before being discharged from the turbogenerator/motor 710.

Figure 20:
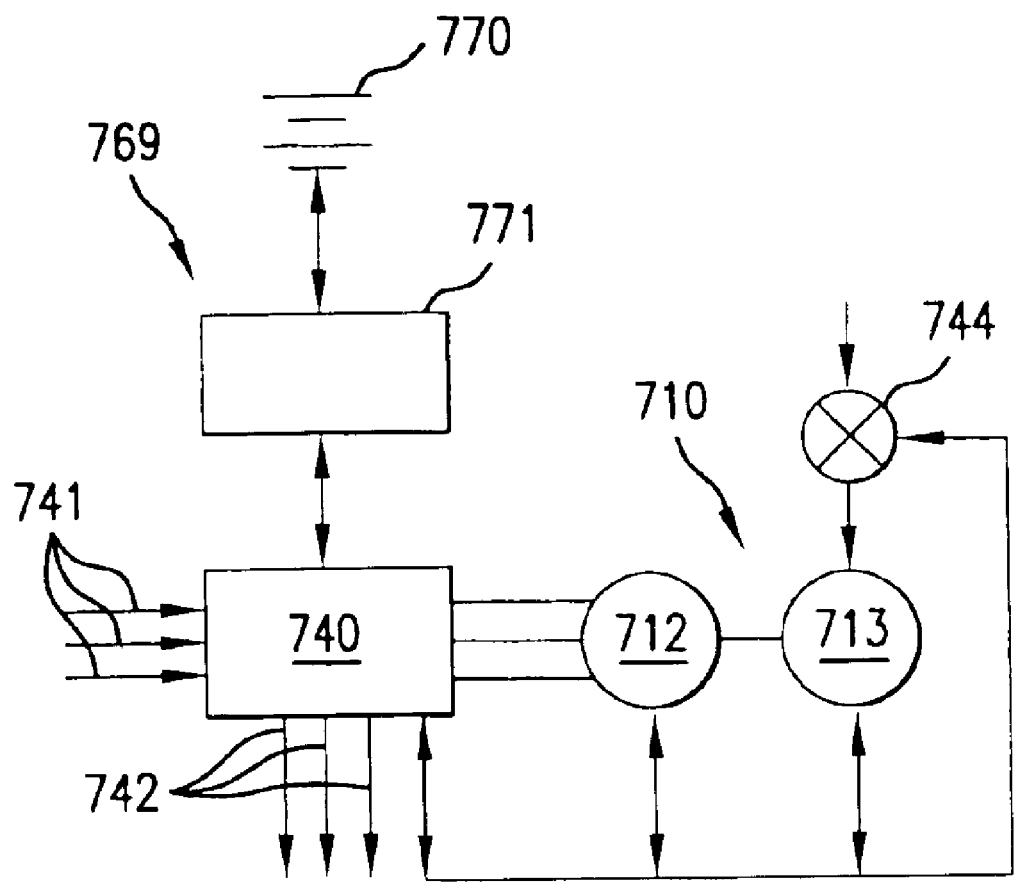
FIG. 20 is a functional block diagram of the interface between the permanent magnet turbogenerator/motor of FIG. 19 and the controller with an energy storage and discharge system of the present invention.

A functional block diagram of the interface between the generator controller 740 and the permanent magnet turbogenerator/motor 710 for stand-alone operation is illustrated in FIG. 20. The generator controller 740 receives power 741 from a source such as a utility to operate the permanent magnet generator 712 as a motor to start the turbine 731 of the power head 713. During the start sequence, the utility power 741 is rectified and a controlled frequency ramp is supplied to the permanent magnet generator 712 which accelerates the permanent magnet rotor 716 and the compressor wheel 732, bearing rotor 736 and turbine wheel 733. This acceleration provides an air cushion for the air bearings and airflow for the combustion process. At about 12,000 rpm, spark and fuel are provided and the generator controller 740 assists acceleration of the turbogenerator 710 up to about 40,000 rpm to complete the start sequence. The fuel control valve 744 is also regulated by the generator controller 740.

Once self sustained operation is achieved, the generator controller 740 is reconfigured to produce 60 hertz, three phase AC (208 volts) 742 from the rectified high frequency AC output (280–380 volts) of the high speed permanent magnet turbogenerator 710. The permanent magnet turbogenerator 710 is commanded to a power set point with speed varying as a function of the desired output power. For grid connect applications, output AC 742 is connected to power input 741, and these terminals are then the single grid connection.

The generator controller 740 also includes an energy storage and discharge system 769 having an ancillary electric storage device 770 which is connected through control electronics 771. This connection is bi-directional in that electrical energy can flow from the ancillary electric storage device 770 to the generator controller 740, for example during turbogenerator/motor start-up, and electrical energy can also be supplied from the turbogenerator/motor controller 740 to the ancillary electric storage device 770 during sustained operation.

While the ancillary electric energy device 770 is schematically illustrated as an electric storage battery, other electric energy storage devices can be utilized. By way of example, these would include flywheels, high energy capacitors and the like.

Figure 21:
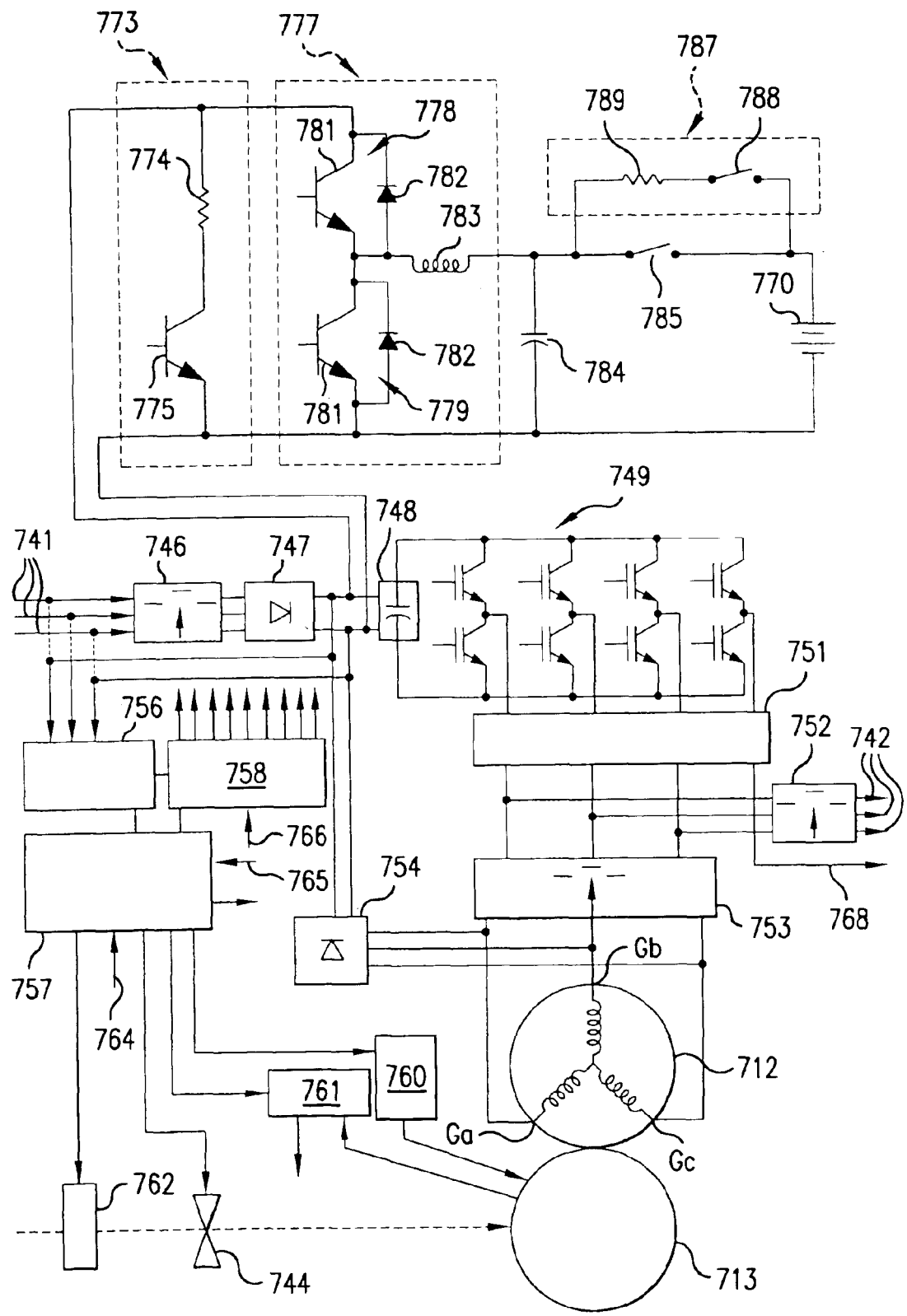
FIG. 21 is a functional block diagram of the permanent magnet turbogenerator/motor controller with an energy storage and discharge system of the present invention.

The functional blocks internal to the generator controller 740 are illustrated in FIG. 21. The generator controller 740 includes in series the start power contactor 746, rectifier 747, DC bus capacitors 748, pulse width modulated (PWM) inverter 749, AC output filter 751, output contactor 752, generator contactor 753, and permanent magnet generator 712. The generator rectifier 754 is connected from between the rectifier 747 and bus capacitors 748 to between the generator contactor 753 and permanent magnet generator 712. The AC power output 742 is taken from the output contactor 752 while the neutral is taken from the AC filter 751.

The control logic section consists of control power supply 756, control logic 757, and solid state switched gate drives illustrated as integrated gate bipolar transistor (IGBT) gate drives 758, but may be any high speed solid state switching device. The control logic 757 receives a temperature signal 764 and a current signal 765 while the IGBT gate drives 758 receive a voltage signal 766. The control logic 757 sends control signals to the fuel cutoff solenoid 762, the fuel control valve(s) 744 (which may be a number of electrically controlled valves), the ignitor 760 and release valve 761. AC power 741 is provided to both the start power contactor 746 and in some instances directly to the control power supply 756 in the control logic section of the generator controller 740 as shown in dashed lines.

Utility start power 741, (for example, 208 AC voltage, 3 phase, 60 hertz), is connected to the start power contactor 746 through fuses (not shown). The start power contactor 746 may consist of a first normally open relay and a second normally closed relay, both of which are de-energized at start up. Alternately, both relays may be normally open and the control power supply 756 receives input directly from utility power input 741. Flameproof power resistors can parallel the relays to provide a reduced current (approximately 10 amps maximum) to slowly charge the internal bus capacitors 748 through the rectifier 747 to avoid drawing excessive inrush current from the utility.

Once the bus capacitors 748 are substantially charged, (to approximately 180 VDC, or 80% of nominal), the control power supply 756 starts to provide low voltage logic levels to the control logic 757. Once the control logic microprocessor has completed self tests, coil power is provided to first normally open relay of the start power contactor 746 to fully charge the bus capacitors 748 to full peak line voltage. The bus capacitors 748 can be supplemented for high frequency filtering by additional film type (dry) capacitors.

The energy storage and discharge system 769 is connected to the controller 740 across the voltage bus Vbus between the rectifier 747 and DC bus capacitor 748 together with the generator rectifier 743. The energy storage and discharge system 769 includes an off-load device 773 and ancillary energy storage and discharge switching devices 777 both connected across voltage bus Vbus.

The off-load device 773 includes an off-load resistor 774 and an off-load switching device 775 in series across the voltage bus Vbus. The ancillary energy storage and discharge switching device 777 comprises a charge switching device 778 and a discharge switching device 779, also in series across the voltage bus Vbus. Each of the charge and discharge switching devices 778, 779 include a solid state switched gate drive 81, shown as an integrated gate bipolar transistor (IGBT) gate drive and an anti-parallel diode 782. Capacitor 784 and ancillary storage and discharge device 770, illustrated as a battery, are connected across the discharge switching device 779 with main power relay 785 between the capacitor 784 and the ancillary energy storage and discharge device 770. Inductor 783 is disposed between the charge switching device 778 and the capacitor 784. A precharge device 787, consisting of a precharge relay 788 and precharge resistor 789, is connected across the main power relay 785.

The PWM inverter 749 operates in two basic modes: a variable voltage (0–190 V line to line), variable frequency (0–700 hertz) constant volts per hertz, three phase mode to drive the permanent magnet generator/motor 712 for start up or cool down when the generator contactor 752 is closed; or a constant voltage (120 V line to neutral per phase), constant frequency three phase 60 hertz mode. The control logic 757 and IGBT gate drives 758 receive feedback via current signal 765 and voltage signal 766, respectively, as the turbine generator is ramped up in speed to complete the start sequence. The PWM inverter 749 is then reconfigured to provide 60 hertz power, either as a current source for grid connect, or as a voltage source.

The generator contactor 753 connects the permanent magnet generator 712 to the inverter 749 during the start sequence. Initial starting current approximates nominal operating current for about 2 seconds then reduces to a lower value for the balance of the acceleration period. After the start sequence is completed, the generator 712 produces enough output voltage at the output terminals of the generator rectifier 754 to provide three phase regulated output from the inverter 749, so both the start contactor 746 and generator contactor are opened and the system is then self sustaining.

During startup of the permanent magnet turbogenerator/motor 710, both the start power contactor 746 and the generator contactor 753 are closed and the output contactor 752 is open. Once self sustained operation is achieved, the start power contactor 746 and the generator contactor 753 are opened and the PWM inverter 749 is reconfigured to a controlled 60 hertz mode. After the reconfiguration of the PWM inverter 749, the output contactor 752 is closed to connect the AC output 742. The start power contactor 746 and generator contactor 753 remain open.

The PWM inverter 749 is truly a dual function inverter which is used both to start the permanent magnet turbogenerator/motor 710 and is also used to convert the permanent magnet turbogenerator/motor output to utility power, either sixty hertz, three phase for stand alone applications, or as a current source device. With start power contactor 746 closed, single or three phase utility power is brought through the start power contactor 746 to be able to operate into a bridge rectifier 747 and provide precharged power and then start voltage to the bus capacitors 748 associated with the PWM inverter 749. This allows the PWM inverter 749 to function as a conventional adjustable speed drive motor starter to ramp the permanent magnet turbogenerator/motor 710 up to a speed sufficient to start the gas turbine 731.

An additional rectifier 754, which operates from the output of the permanent magnet turbogenerator/motor 710, accepts the three phase, up to 380 volt AC from the permanent magnet generator/motor 12 which at full speed is 1600 hertz and is classified as a fast recovery diode rectifier bridge. Six diode elements arranged in a classic bridge configuration comprise this high frequency rectifier 754 which provides output power at DC. The rectified voltage is as high as 550 volts under no load.

The permanent magnet turbogenerator/motor 710 is basically started at zero frequency and rapidly ramps up to approximately 12,000 rpm. This is a two pole permanent magnet generator/motor 712 and as a result 96,000 rpm equals 1,600 hertz. Therefore 12,000 rpm is ⅛th of that or 200 hertz. It is operated on a constant volt per hertz ramp, in other words, the voltage that appears at the output terminals is ⅛th of the voltage that appears at the output terminals under full speed.

Approximate full speed voltage is 380 volts line to line so it would be approximately ⅛th of that. When the PWM inverter 749 has brought the permanent magnet turbogenerator/motor 710 up to speed, the fuel solenoid 762, fuel control valve 744 and ignitor 760 cooperate to allow the combustion process to begin. Using again the adjustable speed drive portion capability of the PWM inverter 749, the permanent magnet turbogenerator/motor 710 is then accelerated to approximately 35,000 or 40,000 rpm at which speed the gas turbine 731 is capable of self sustaining operation.

The AC filter 751 is a conventional single pass LC filter which simply removes the high frequency, in this case approximately twenty kilohertz, switching component. Because the voltage in start mode is relatively low, its rectified 208 volt line which is approximately 270 volts, a single bus capacitor 748 is capable of standing that voltage. However, when in generate mode, the DC output of the generator rectifier 754 can supply voltages as high as 550 volts DC, requiring two capacitors to be series connected to sustain that voltage.

The reconfiguration or conversion of the PWM inverter 749 to be able to operate as a current source synchronous with the utility grid is accomplished by first stopping the PWM inverter 749. The AC output or the grid connect point is monitored with a separate set of logic monitoring to bring the PWM inverter 749 up in a synchronized fashion. The generator contactor 753 functions to close and connect only when the PWM inverter 749 needs to power the permanent magnet turbogenerator/motor 710 which is during the start operation and during the cool down operation. The output contactor 752 is only enabled to connect the PWM inverter 749 to the grid once the PWM inverter 749 has synchronized with grid voltage.

The implementation of the control power supply 756 first drops the control power supply 756 down to a 24 volt regulated section to allow an interface with a battery or other control power device. The control power supply 756 provides the conventional logic voltages to both the IGBT gate drives 758 and control logic 757. The IGBT gate drives 758 have two isolated low voltage sources to provide power to each of the two individual IGBT drives and the interface to the IGBT transistors is via a commercially packaged chip.

The off-load device 773, including off-load resistor 774 and off-load switching device 775 can absorb thermal energy from the turbogenerator 710 when the load terminals are disconnected, either inadvertently or as the result of a rapid change in load. The off-load switching device 775 will turn on proportionally to the amount of off-load required and essentially will provide a load for the gas turbine 731 while the fuel is being cut back to stabilize operation at a reduced level. The system serves as a dynamic brake with the resistor connected across the DC bus through an IGBT and serves as a load on the gas turbine during any overspeed condition.

Thus, in accordance with the invention, turbogenerator 710 may be operated at or near peak efficiency while supplying varying load requirements by being operated at a constant or substantially constant turbine temperature, which may be near or at the maximum turbine temperature. The turbine temperature regulated may be the turbine inlet temperature or the turbine outlet temperature, either of which may be measured or inferred from other measured variables (for instance, the turbine inlet temperature may be inferred or calculated from the measured turbine outlet temperature). During load transients the load on the generator 712 is regulated to control the shaft speed of turbogenerator 710 to meet the new load requirement while the turbine temperature is maintained at a constant or a substantially constant value. To obtain maximum efficiency the combustor temperature at which turbogenerator 710 is operated is at or near the maximum turbine temperature, which is mainly dictated by the materials used in constructing the combustor and turbine and is selected based, among others, on the desired design life of the combustor. In one embodiment, the combustor is operated at the maximum design temperature selected on a desired combustor design life (e.g. 40,000 hours), and during an increase in load demand the temperature is allowed to temporarily increase above this limit (e.g. by 50° F. or any other desirable amount) to maintain combustor flame stability and to allow the turbine speed to increase in a shorter period of time.

In addition, the ancillary electric storage device 770 can continue motoring the turbogenerator 710 for a short time after a shutdown in order to cool down the turbogenerator 710 and prevent the soak back of heat from the recuperator 715. By continuing the rotation of the turbogenerator 710 for several minutes after shutdown, the power head 713 will keep moving air and sweep heat away from the permanent magnet generator 712. This keeps heat in the turbine end of the power head 713 where it is not as much of a problem.

The battery switching devices 777 provide a dual path since the ancillary electric storage device 770 is bi-directional operating from the generator controller 740. The ancillary electric storage device 770 can provide energy to the power inverter 749 when a sudden demand or load is required and the gas turbine 731 is not up to speed. At this point, the battery discharge switching device 779 turns on for a brief instant and draws current through the inductor 783. The battery discharge switching device 779 is then opened and the current path continues by flowing through the diode 782 of the battery charge switching device 778 and then in turn provides current into the inverter capacitor 748. The ancillary electric storage device 770 is thus used to provide a portion of the total power demand, including the additional transient demand, on the turbogenerator system 710.

The battery discharge switching device 779 is operated at a varying duty cycle, high frequency, rate to control the amount of power and can also be used to initially ramp up the controller 740 for battery start operations. After the system is in a stabilized, self-sustaining condition, the battery charge switching device 778 is used exactly in the opposite. At this time, the battery charge switching device 778 periodically closes in a high frequency modulated fashion to force current through inductor 783 and into capacitor 784 and then directly into the ancillary electric storage device 770. Thus, at this time the ancillary electric storage device 770 absorbs a portion of the power generated by turbogenerator 710.

The capacitor 784, connected to the ancillary electric storage device 770 via the precharge relay 788 and resistor 789 and the main power relay 85, is provided to isolate the ancillary electric storage device 770 when it is in an off-state. The normal, operating sequence is that the precharge relay 788 is momentarily closed to allow charging of all of the capacitive devices in the entire system and them the main power relay 785 is closed to directly connect the ancillary electric storage device 770 with the control electronics 771. While the main power relay 785 is illustrated as a switch, it may also be a solid state switching device.

The ancillary electric storage device 770 is utilized to supplement the gap between the gas turbine 731 coming up to a steady state condition and the requirements of the inverter 749 to support the load. The energy required to support the load is the energy interval between the thermal response time of the gas turbine 731 and the load requirement, which in terms of actual stored energy is relatively small. During an off-load, the energy is dissipated resistively, and simultaneously with that command the fuel flow is cut to a minimum allowable level to sustain combustion in the gas turbine 31 but allow a maximum off-load of power. The off-load device 773 of the energy storage and discharge system 769 thus effectively places an additional power or load demand on the turbogenerator 710 to produce additional power over the actual power demand and thus slow the turbogenerator down to a speed required to produce the actual power demand, at which point the energy storage and discharge system 769 no longer needs to absorb the additional power produced by the turbogenerator.

Another advantage of the system of the invention is that it can be operated in a grid parallel fashion supporting a protective load. It will allow the combination of the ancillary electric storage device 770 and the inverter 749 to support a load in the sudden removal of utility power and allow a specific load to be protected in much the same manner that an "uninterruptable power system" protects a critical load.

Having now described the invention in accordance with the requirements of the patent statutes, those skilled in this art will understand how to make changes and modifications in the present invention to meet their specific requirements or conditions. For example, the power controller, while described generally, may be implemented in an analog or digital configuration. In the preferred digital configuration, one skilled in the art will recognize that various terms utilized in the invention are generic to both analog and digital configurations of power controller. For example, converters referenced in the present application is a general term which includes inverters, signal processors referenced in the present application is a general term which includes digital signal processors, and so forth. Correspondingly, in a digital implementation of the present invention, inverters and digital signal processors would be utilized. Such changes and modifications may be made without departing from the scope and spirit of the invention as set forth in the following claims.

What is claimed is:

1. A method of controlling a turbine of a turbine powered generating system regardless of the load on the system, to maximize the efficiency of the turbine, the system further including an electrical generator, and a storage device, the method comprising:

maintaining an exhaust gas temperature substantially constant;

using the electrical generator to satisfy a first power demand on the system until the system is required to satisfy an additional power demand;

when the additional power is demanded, temporarily using the storage device to satisfy the additional power demand and at least a portion of the first power demand;

increasing the speed of the turbine from the speed required to satisfy the first power demand to a higher speed required to satisfy the first power demand and the additional power demand; and once the higher speed is achieved, using the electrical generator to satisfy both the first power demand and the additional power demand.

2. The method as set forth in claim 1, wherein the substantially constant exhaust gas temperature is at or near the maximum design temperature of the turbine.

3. The method of claim 1, wherein the external storage device is used to temporarily satisfy all of the additional power demand and the first power demand.

4. A method of controlling a turbine of a turbine powered generating system, regardless of the load on the system, to maximize the efficiency of the turbine, the system further including an electrical generator, and a storage device, the method comprising:

maintaining an exhaust gas of the turbine at a substantially constant temperature;

using the electrical generator to satisfy a first power demand on the system until the system is required to satisfy a lower power demand;

when the lower power is demanded, temporarily increasing the first power demand on the generator and temporarily using the storage device to absorb the additional power demand and at least a portion of the first power demand;

decreasing the speed of the turbine from the speed required to satisfy the first power demand to a lower speed required to satisfy the lower power demand; and once the lower speed is achieved, using the electrical generator to satisfy the lower power demand.

5. A method as set forth in claim 4, wherein the constant exhaust temperature is at or near the maximum design temperature of the turbine.

6. A turbine powered generating system comprising:
a turbine having a predetermined maximum exhaust gas temperature;
a generator coupled to the turbine and capable of supplying a first power demand on the system;
an energy storage device capable of supplying the first power demand on the system; and
a controller, coupled to both the storage device and the turbine, for maintaining an exhaust gas temperature at or near the maximum exhaust gas temperature, the controller, in response to an additional power demand on the system, causing the energy storage device to satisfy the additional power demand and at least a portion of the first power demand, to allow the speed of the turbine to increase to a higher speed at which the generator can satisfy the additional power demand and the first power demand.

7. The generating system of claim 6, wherein the controller causes the additional power demand and the first power demand to be shifted to the generator when the turbine reaches the higher speed.

8. The generating system of claim 6, wherein the controller, in response to the additional power demand, causes the energy storage device to temporarily supply all of the first power demand and the additional power demand.

9. The generating system of claim 6, wherein the storage device is selected from the group including a battery, a flywheel, a capacitor and a power grid.

10. The generating system of claim 9, wherein the storage device is a battery and the battery is sized to supply the maximum power demand on the system.

11. The generating system of claim 6, wherein the turbine is a microturbine.

12. The generating system of claim 11, wherein the microturbine is a recuperated microturbine.

13. The generating system of claim 6, wherein the controller includes means, in response to a lower power demand on the system, for causing the first power demand on the generator to be temporarily increased and temporarily absorbed by the energy storage device.

14. The generating system of claim 13, wherein the controller shifts the lower power demand to the generator when the turbine has decelerated to the speed required to satisfy the lower power demand.

15. A turbine powered generating system comprising:
a turbine having a predetermined maximum exhaust gas temperature;
a generator coupled to the turbine and capable of supplying a first power demand on the system;
an energy storage device capable of temporarily absorbing at least a portion of the first power demand on the system; and
a controller, coupled to both the storage device and the turbine, for maintaining an exhaust gas temperature at or near the maximum exhaust gas temperature, the controller including means, in response to a decreased power demand on the system, for temporarily causing an additional power demand on the generator and for causing the additional power demand and at least a portion of the first power demand to be shifted to the energy storage device to allow the speed of the turbine to decrease to a lower speed, where the generator can supply the decreased power demand.

16. Apparatus for controlling a turbine power generation system, the apparatus being responsive to a load demand during operation, the apparatus comprising:
a turbine;
an electric generator coupled to the turbine;
an energy storage device;
a controller including means for monitoring the speed of the turbine and an exhaust gas temperature, the controller further including means for determining whether to shift any of the load demand from the generator to the energy storage device when the load demand changes; and
means, responsive to the controller, for regulating fuel flow to the turbine to hold the exhaust gas temperature substantially constant, even when the load demand changes.

17. The apparatus of claim 16, wherein the controller causes the regulating means hold the temperature of the exhaust gas temperature substantially constant, independent of turbine speed.

18. The apparatus of claim 16, wherein turbine speed is controlled by regulating a load on the generator in order to maintain a speed set point.

19. The apparatus of claim 18, wherein the turbine speed set point is determined by the load demand and achieved by controlling the generator load independent of the load demand.

20. The apparatus of claim 18, wherein the controller causes the generator load to increase when the turbine speed increases above the speed set point.

* * * * *